US010296795B2

(12) United States Patent
Kwant et al.

(10) Patent No.: US 10,296,795 B2
(45) Date of Patent: May 21, 2019

(54) METHOD, APPARATUS, AND SYSTEM FOR ESTIMATING A QUALITY OF LANE FEATURES OF A ROADWAY

(71) Applicant: HERE GLOBAL B.V., Eindhoven (NL)

(72) Inventors: Richard Kwant, Oakland, CA (US); Anish Mittal, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 16 days.

(21) Appl. No.: 15/633,057

(22) Filed: Jun. 26, 2017

(65) Prior Publication Data

US 2018/0373941 A1    Dec. 27, 2018

(51) Int. Cl.
G05D 1/02 (2006.01)
G06K 9/00 (2006.01)
G06K 9/20 (2006.01)
G08G 1/16 (2006.01)

(52) U.S. Cl.
CPC ....... G06K 9/00798 (2013.01); G05D 1/0246 (2013.01); G06K 9/209 (2013.01); G08G 1/167 (2013.01); B60R 2300/804 (2013.01)

(58) Field of Classification Search
CPC .. G06K 9/00798; G06K 9/209; G05D 1/0246; G08G 1/167; B60R 2300/804
See application file for complete search history.

(56) References Cited

U.S. PATENT DOCUMENTS

| 7,295,682 | B2 | 11/2007 | Otsuka et al. |
| 8,004,428 | B2 | 8/2011 | Koenig |
| 8,948,954 | B1 | 2/2015 | Ferguson et al. |
| 9,063,548 | B1 | 6/2015 | Ferguson et al. |
| 2008/0013789 | A1* | 1/2008 | Shima ................ G06K 9/00798 382/104 |
| 2015/0325127 | A1* | 11/2015 | Pandita .................... G08G 1/16 701/431 |
| 2015/0371094 | A1 | 12/2015 | Gardiner et al. |

(Continued)

OTHER PUBLICATIONS

Revilloud et al., "A New Approach for Robust Road Marking Detection and Tracking Applied to Multi-Lane Estimation", The 2013 IEEE Intelligent Vehicles Symposium, Jun. 2013, 9 pages.

(Continued)

*Primary Examiner* — James J Yang
*Assistant Examiner* — Kevin Lau
(74) *Attorney, Agent, or Firm* — Ditthavong & Steiner, P.C.

(57) ABSTRACT

An approach is provided for estimating a quality of lane features of a roadway. The approach involves processing, by a computer vision system, an input image to detect the lane features of the roadway. The approach also involves determining respective confidence values associated with a plurality of regions of the input image used to detect the lane features. The respective confidence values represent a probability of predicting the lane features from each of the plurality of regions. The approach further involves performing a classification of the plurality of regions into a plurality of confidence levels based on the respective confidence values. The approach further involves determining the estimated quality of the lane features based on the classification of the plurality of regions.

16 Claims, 20 Drawing Sheets

(56) References Cited

U.S. PATENT DOCUMENTS

2015/0375752 A1* 12/2015 Carlsson ............... G01C 21/26
                                                              702/5
2016/0282127 A1*  9/2016 Goto .................... G01C 21/30
2018/0157934 A1*  6/2018 Hu ...................... G06K 9/6262

OTHER PUBLICATIONS

Kim et al., abstract of "Lane Confidence Assessment and Lane Change Decision for Lane-level Localization", 2014 14th International Conference on Control, Automations and Systems (ICCAS), Dec. 2014, 3 pages.

Wang et al., "Lane Markers Detection based on Consecutive Threshold Segmentation", Journal of Information and Computing Science, vol. 6, No. 3, 2011, pp. 207-212.

* cited by examiner

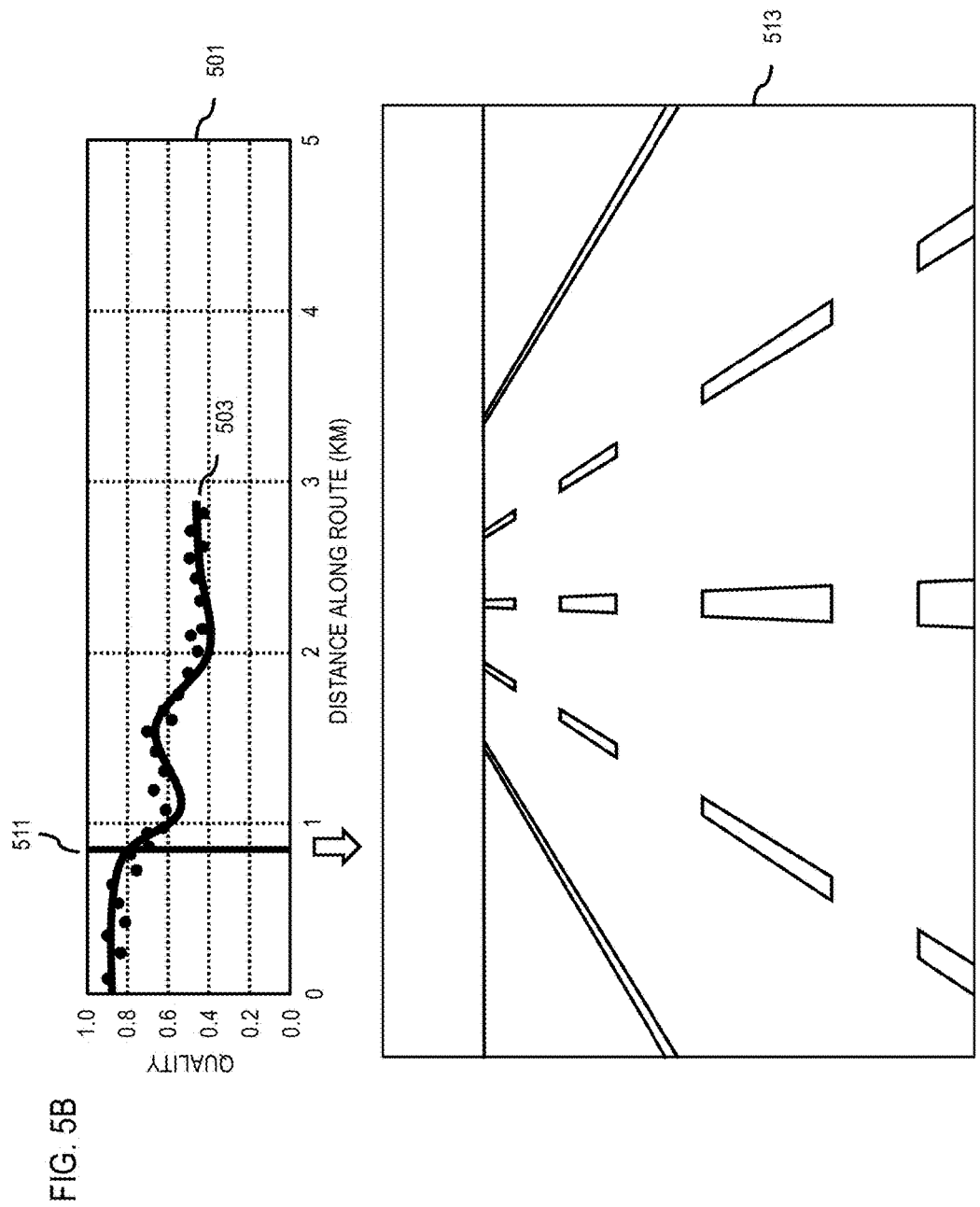

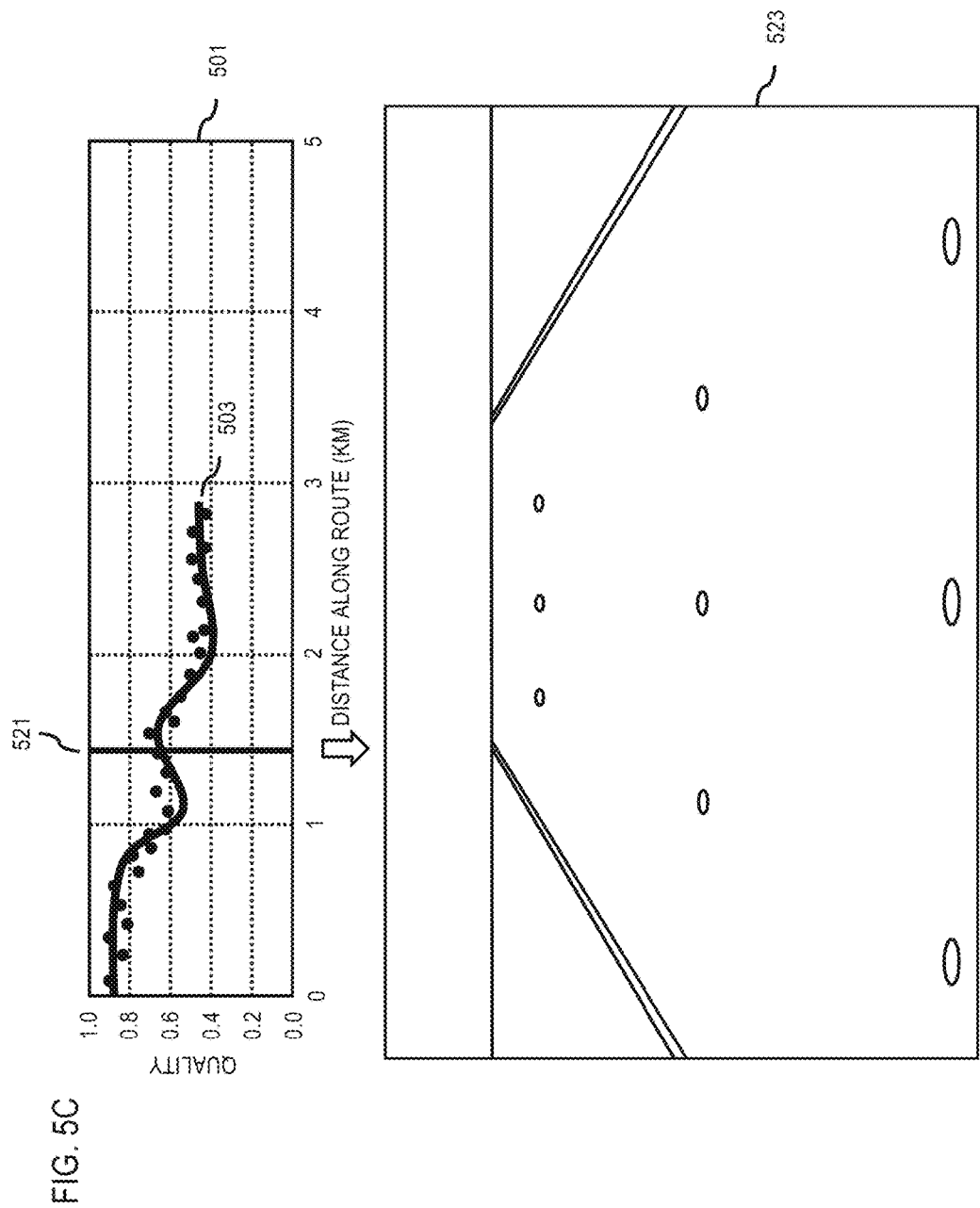

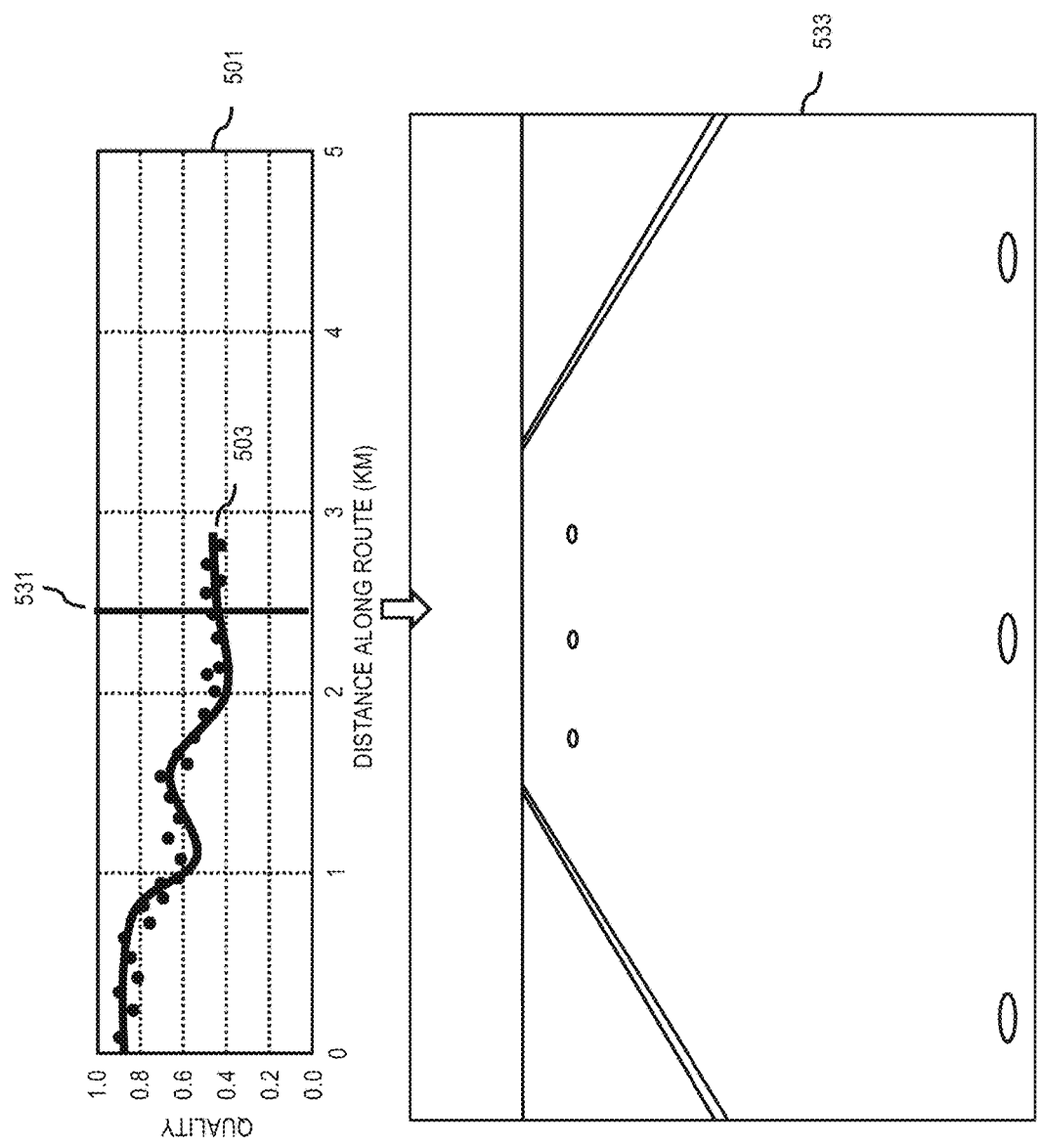

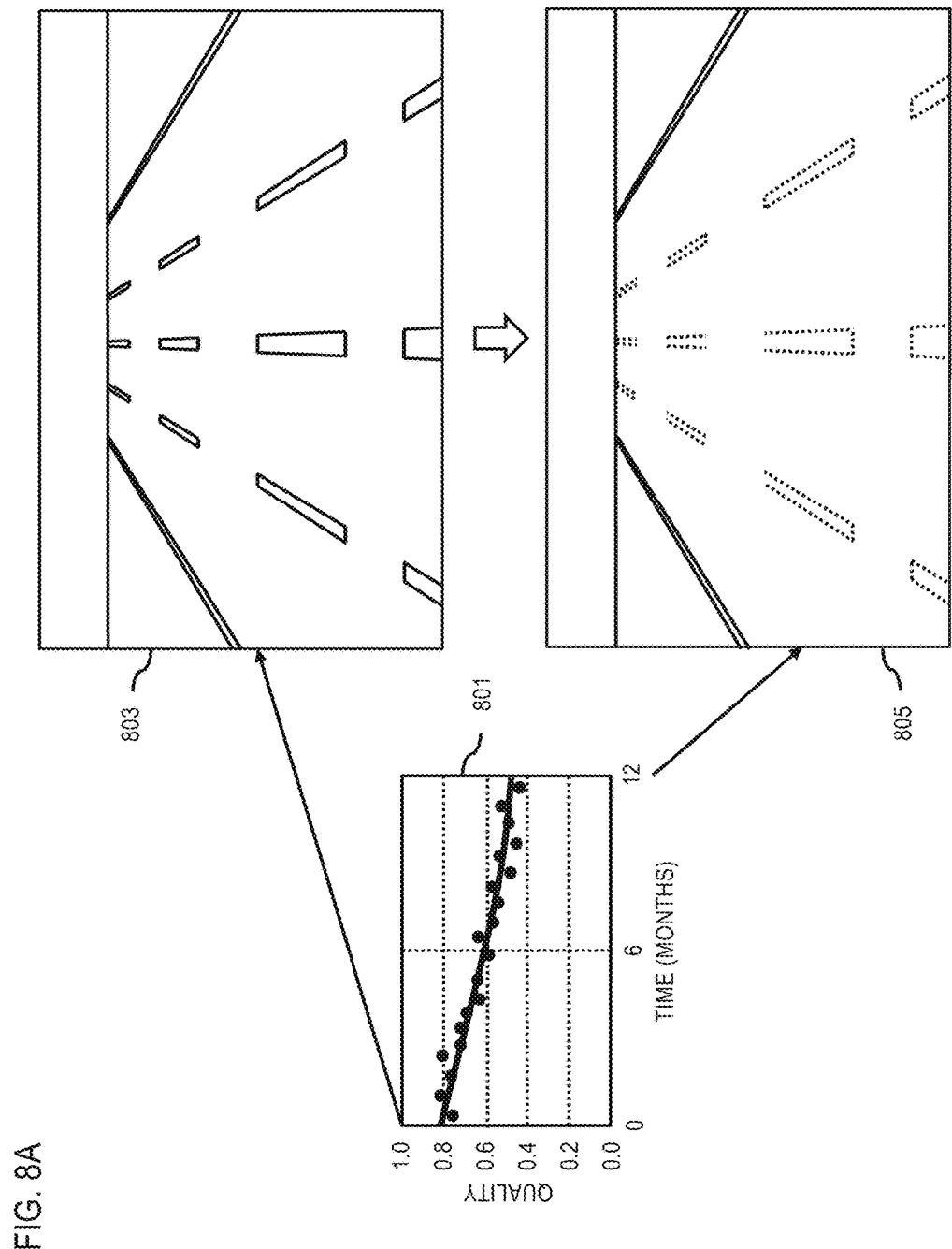

METHOD, APPARATUS, AND SYSTEM FOR ESTIMATING A QUALITY OF LANE FEATURES OF A ROADWAY

BACKGROUND

Autonomous driving has quickly become an area of interest for vehicle manufacturers and navigation and mapping service providers. One particular area of interest is the use of computer vision to enable mapping and sensing of a vehicle's environment to support autonomous or semi-autonomous operation. Advances in available computing power have enabled this mapping and sensing to approach or achieve real-time operation through, e.g., machine learning (e.g., neural networks). As a result, one application of vision techniques in autonomous driving is localization of the vehicle with respect to known reference marks such as lane markings and/or other visible environmental features. More specifically, localization for autonomous driving generally requires a high degree of precision and accuracy. Accordingly, when localizing based on lane markings and/or performing other mapping or navigation related functions that depend on detected lane markings, service providers and manufacturers face significant technical challenges to enable efficient estimation of the quality of detected lane features to ensure that the lane data meet applicable quality requirements.

SOME EXAMPLE EMBODIMENTS

Therefore, there is a need for an approach for estimating a quality of lane features (e.g., lane markings, lane lines, etc.) automatically detected from captured images (e.g., a video capture stream from an autonomous vehicle).

According to one embodiment, a computer-implemented method for determining an estimated quality of lane features of a roadway comprises processing, by a computer vision system, an input image to detect the lane features of the roadway. The method also comprises determining respective confidence values associated with a plurality of regions of the input image used to detect the lane features. The respective confidence values represent a probability of predicting the lane features from each of the plurality of regions. The method further comprises performing a classification of the plurality of regions into a plurality of confidence levels based on the respective confidence values. The method further comprises determining the estimated quality of the lane features based on the classification of the plurality of regions.

According to another embodiment, an apparatus for determining an estimated quality of lane features of a roadway comprises at least one processor, and at least one memory including computer program code for one or more computer programs, the at least one memory and the computer program code configured to, with the at least one processor, cause, at least in part, the apparatus to process, by a computer vision system, an input image to detect the lane features of the roadway. The apparatus is also caused to determine respective confidence values associated with a plurality of regions of the input image used to detect the lane features. The respective confidence values represent a probability of predicting the lane features from each of the plurality of regions. The apparatus is further caused to perform a classification of the plurality of regions into a plurality of confidence levels based on the respective confidence values. The apparatus is further caused to determine the estimated quality of the lane features based on the classification of the plurality of regions.

According to another embodiment, a non-transitory computer-readable storage medium for determining an estimated quality of lane features of a roadway carries one or more sequences of one or more instructions which, when executed by one or more processors, cause, at least in part, an apparatus to process, by a computer vision system, an input image to detect the lane features of the roadway. The apparatus is also caused to determine respective confidence values associated with a plurality of regions of the input image used to detect the lane features. The respective confidence values represent a probability of predicting the lane features from each of the plurality of regions. The apparatus is further caused to perform a classification of the plurality of regions into a plurality of confidence levels based on the respective confidence values. The apparatus is further caused to determine the estimated quality of the lane features based on the classification of the plurality of regions.

According to another embodiment, an apparatus for determining an estimated quality of lane features of a roadway comprises means for processing, by a computer vision system, an input image to detect the lane features of the roadway. The apparatus also comprises means for determining respective confidence values associated with a plurality of regions of the input image used to detect the lane features. The apparatus further comprises means for performing a classification of the plurality of regions into a plurality of confidence levels based on the respective confidence values. The apparatus further comprises means for determining the estimated quality of the lane features based on the classification of the plurality of regions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams illustrating an example of a variability of lane quality across a distance domain, according to one embodiment;

FIGS. 8A and 8B are diagrams illustrating examples of monitoring an estimated quality of lane features over a temporal domain, according to one embodiment;

DESCRIPTION OF SOME EMBODIMENTS

Examples of a method, apparatus, and computer program for estimating a quality of lane features of a roadway are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
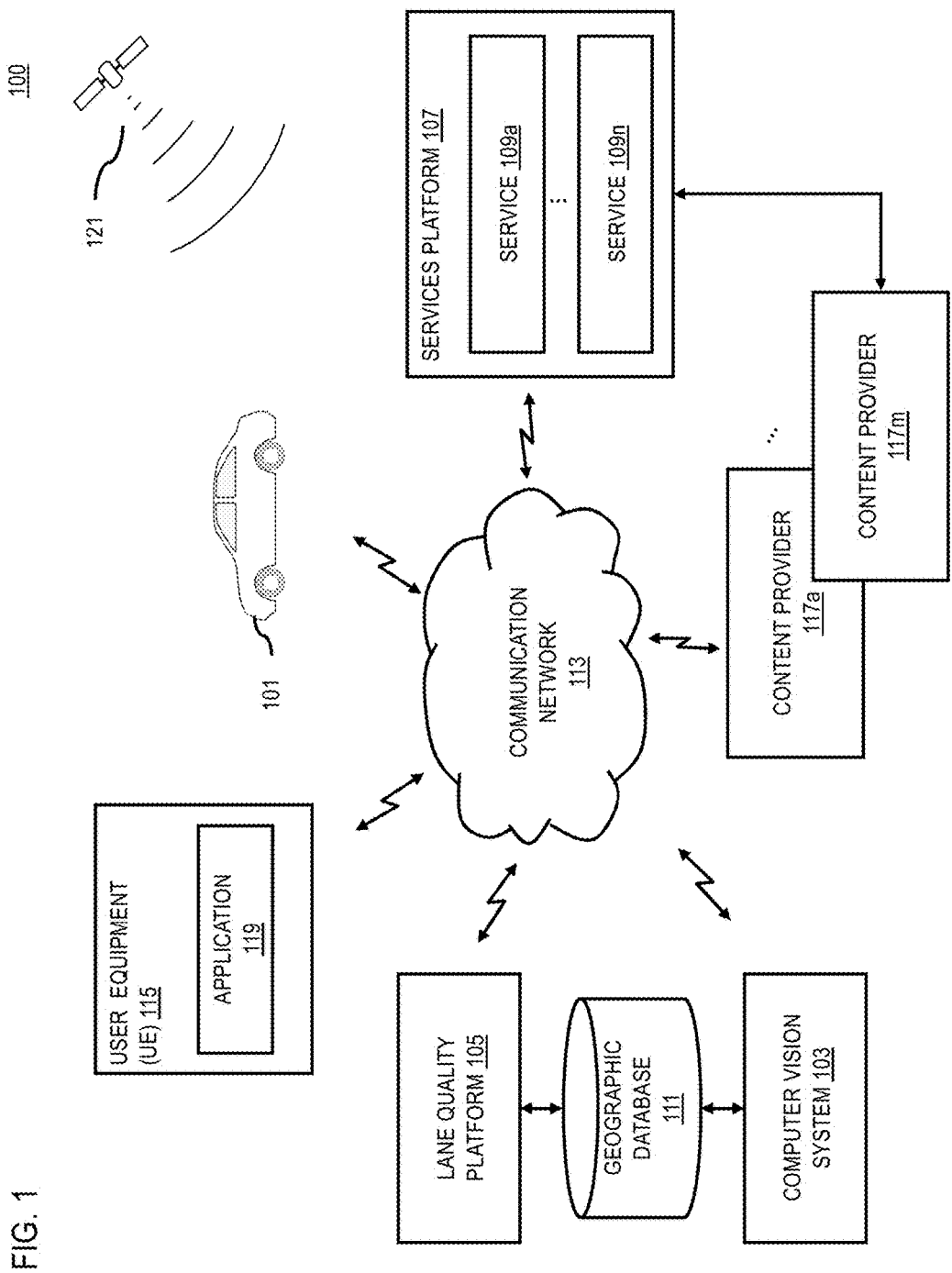
FIG. 1 is a diagram of a system capable of estimating a quality of lane features of a roadway, according to one embodiment.

FIG. 1 is a diagram of a system capable of estimating a quality of lane features of a roadway, according to one embodiment. As discussed above, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a computer vision system 103).

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 101 is needed. Traditionally, most vehicle navigation system has been accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery. These features can then be matched to a database of features to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 (e.g., including the computer vision system 103) focuses on detecting high level features that have semantic meaning for human beings. One such feature that is important to autonomous driving is the detection of lane features (e.g., lane markings, lane lines, Botts' dots, reflectors, etc.) and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

In other words, the success of localization based on features detected from an image can depend on the precise localization of those features within the image and the quality of the technique used to detect the lane features. This success, for instance, can depend greatly on condition of the lane markings or features themselves as captured in the images. For example, degradation in the integrity of the physical lane markings may make them less visible or recognizable by the computer vision system 103. Moreover, this degradation can vary greatly over distance and/or time for a given stretch of roadway. Accordingly, service providers face significant technical challenges determining or estimating the quality of lane features that are automatically detected by a computer vision system 103.

To address these challenges, the system 100 of FIG. 1 introduces a capability to estimate a quality of lane features that are automatically detected from captured image data. In one embodiment, the quality of the lane features refers to real-world quality or characteristics of the lane features (e.g., lane markings) that can determine how visible the lane features or markings are to an autonomous vehicle 101 and/or driver that is traveling on a roadway or a stretch of the roadway on which the lane features are located. For example, the visibility of lane features or markings can be affected by degradation of the paint or materials used to make the lane markings. As another example, the visibility of lane features or markings can be affected if they are covered by some material or substance, such as snow, dirt, debris, or other similar material.

In one embodiment, the system 100 estimates the quality of the detected lane markings based on the confidence levels (e.g., prediction confidence) generated by the lane detector used to process the input image(s). For example, one technique that has shown significant ability to detect lanes is the use of convolutional neural networks or other equivalent machine learning classifiers to process images. Neural networks have shown unprecedented ability to recognize objects in images, understand the semantic meaning of images, and segment images according to these semantic categories. When such neural networks or other machine learning classifiers predict whether an image depicts lane features, they are also compute a confidence or probability that the prediction is likely to be true.

Accordingly, one approach of the embodiments described herein is based on the observation that the confidence with which lane features are predicted is a function of a quality (e.g., physical or real-world quality) of the lane features. In one embodiment, this quality can be based on the visibility of the lane features that could be limited or otherwise affected by paint/material degradation or when there are occluders on the ground like snow, dirt, debris, etc.

In one embodiment, the system 100 (e.g., via a lane quality platform 105) computes an estimated quality of the lane features of a roadway by: (a) performing lane feature predictions on an input image; (b) collating the confidences of the predictions; (c) choosing a confidence threshold below which the prediction quality is classified as low or bad, and above which the prediction quality is classified as high or good; (d) calculating the percentage of image pixels/cells/regions that have high confidence predictions versus low confidence predictions; and (e) analyzing the a variation of this percentage (e.g., over distance and/or time). By way of example, a drop of this percentage can indicate a loss of quality (e.g., visibility) of the lane features in a corresponding roadway. Similarly, an increase of this percentage can indicate an increase of quality or visibility of the lane features.

In one embodiment, the system 100 can use the estimated quality of the lane features in a variety of situations including, but not limited to: (a) confidence with which a map could be updated in the area; (b) reliability of lane predictions for driving purposes (e.g., autonomous driving); (c) detection of bad weather conditions like snow, and rate of road paint deterioration given the knowledge of lane quality/visibility history from the same road; and/or (d) routing planning for navigation to improve user experience and suggest alternatives based on estimated quality.

Figure 2:
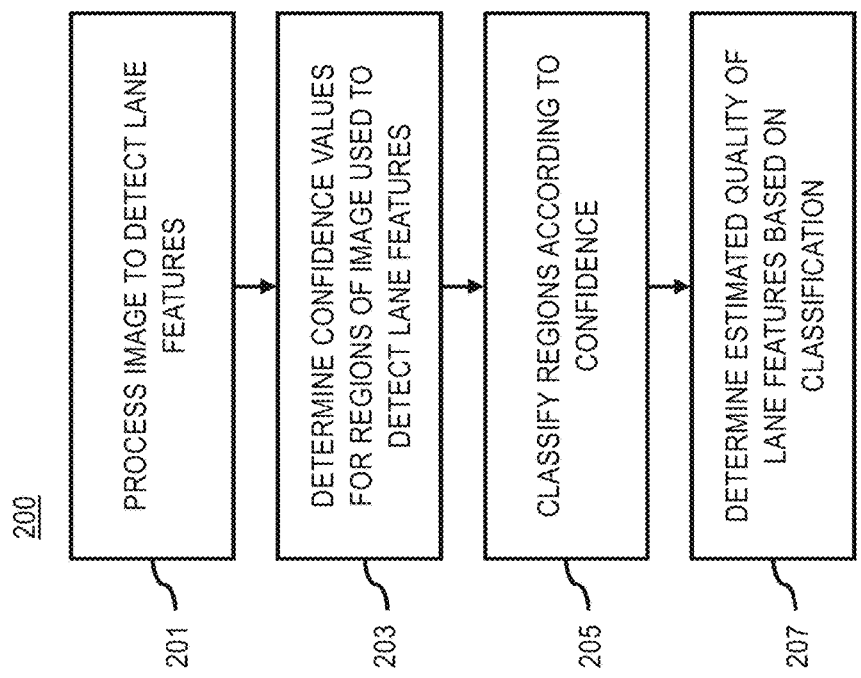
FIG. 2 is a flowchart of a process for estimating a quality of lane features of a roadway, according to one embodiment.
Figure 14:
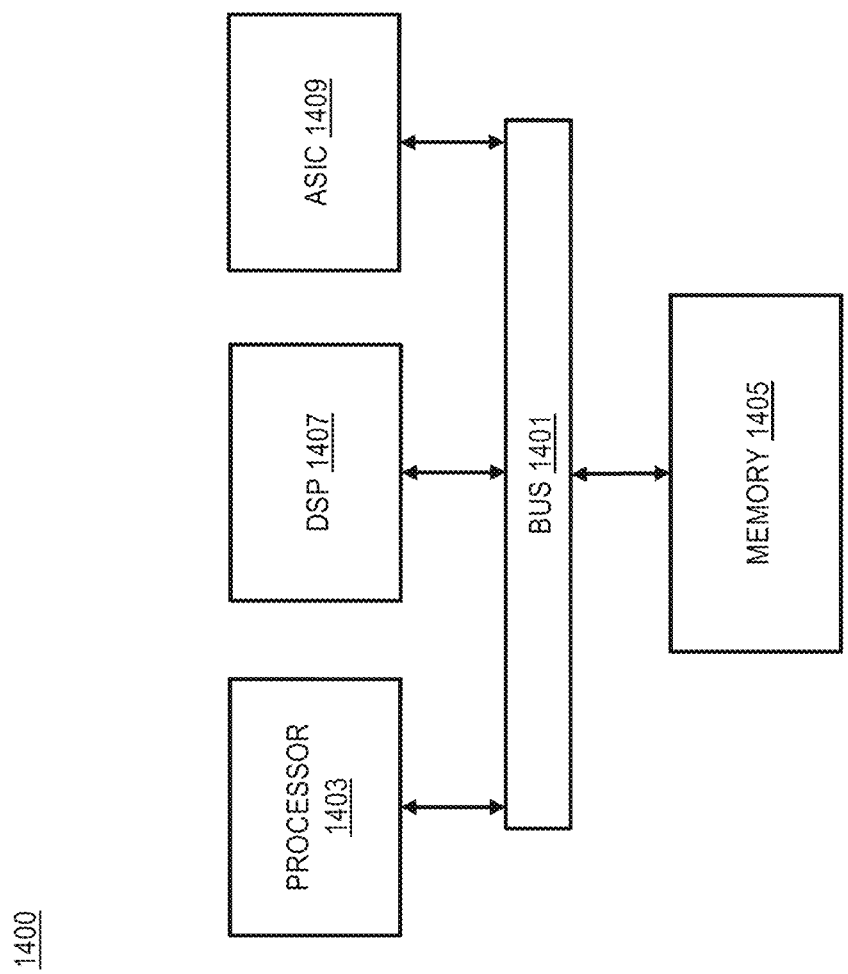
FIG. 14 is a diagram of a chip set that can be used to implement an embodiment of the invention.

FIG. 2 is a flowchart of a process for estimating a quality of lane features of a roadway, according to one embodiment. In one embodiment, the lane quality platform 105 and/or the computer vision system 103 may perform one or more portions of the process 200 and may be implemented in, for instance, a chip set including a processor and a memory as shown in FIG. 14. As such, the lane quality platform 105 and/or the computer vision system 103 can provide means for accomplishing various parts of the process 200. In addition or alternatively, a services platform 107 and/or one or more services 109*a*-109*n* (also collectively referred to as services 109) may perform any combination of the steps of the process 200 in combination with the lane quality platform 105 and/or the computer vision system 103, or as standalone components. Although the process 200 is illustrated and described as a sequence of steps, it is contemplated that various embodiments of the process 200 may be performed in any order or combination and need not include all of the illustrated steps.

In step 201, the lane quality platform 105 processes an input image to detect the lane features of the roadway. By way of example, lane features include, but are not limited to, lane lines, lane markings, Botts' dots, and/or any other feature indicating a travel lane of a roadway. In some cases, lane features can also include wear marks in the roadway that indicate a lane or path taken by vehicles traversing the roadway. The wear marks can include, for instance, lighter shades or groves of a road surface created by passing vehicles.

As noted above, the lane quality platform 105 can use any means known in the art to detect lane features in an input image, provided the means also outputs a prediction confidence value for the detected or predicted lane feature. In one embodiment, a prediction confidence represents a probability that a set of features of an input image or region of the input image is a member of a lane-related class. By way of example, lane-related classes can include, but are not limited to, classes for images/regions with detected lane features and for images/regions with no detected lane features. As another example, the classes can be based on different detectable lane features (e.g., solid lane lines, double lane lines, broken lane lines, lines of different colors, Botts' dots, etc.). Generally, machine learning classifiers (e.g., including neural networks) implement prediction confidence scoring as part of the classification process. For example, Random-Forest-based classifiers implement confidences scoring based on votes and/or content of terminal node. Support vector machine (SVM) and neural network based classifiers also implement confidence scoring. Accordingly, prediction confidence scoring is inherent in most machine learning classifiers, and the system 100 need not expend additional computational resources to obtain confidence values when lane feature detection is performed using machine learning classifiers (e.g., neural networks).

Figure 3:
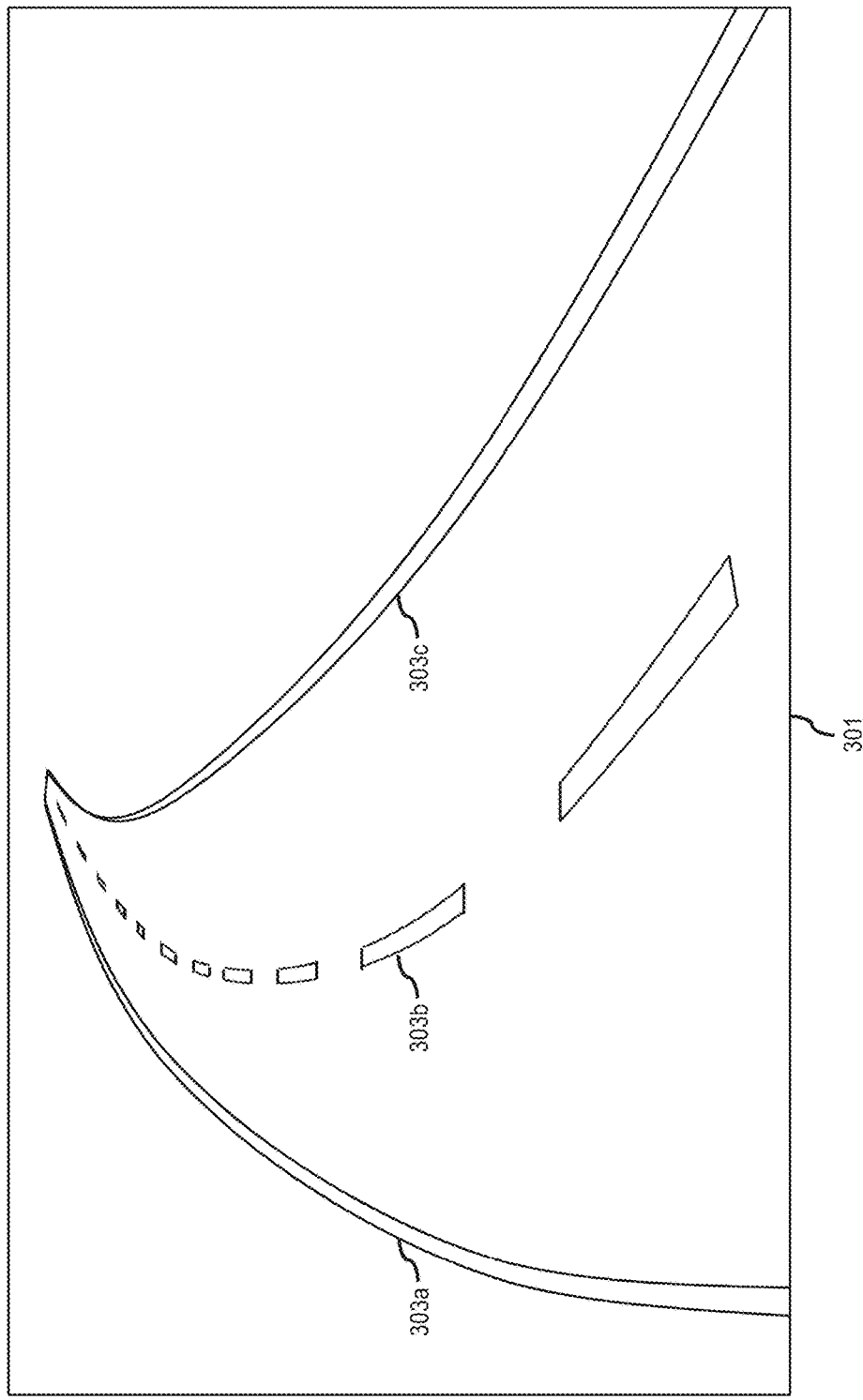
FIG. 3 is a diagram of an input image of lane lines captured by a vehicle camera system, according to one embodiment.

FIG. 3 is a diagram of an example input image 301 depicting lane lines 303*a*-303*c* captured by a vehicle camera system, according to one embodiment. In this example, the image 301 is captured in real-time by a camera system of a vehicle 101 as raster images at a predetermined pixel resolution. In one embodiment, the image 301 can be captured using cameras sensitive to visible light, infra-red, and/or any other wavelength of light. To support real-time operation, the image 301 can be part of an image stream captured at a relatively high frequency (e.g., 10 Hz, 30 Hz, or higher). Each frame of the image stream can then be processed to provide real-time detection of lane-lines. In one embodiment, the output of a lane feature detection process include lane models representing the detected lanes or features, and associated prediction confidence values indicating a probability that the processed features of the input image are predictive of the detected lane features.

Figure 4A:
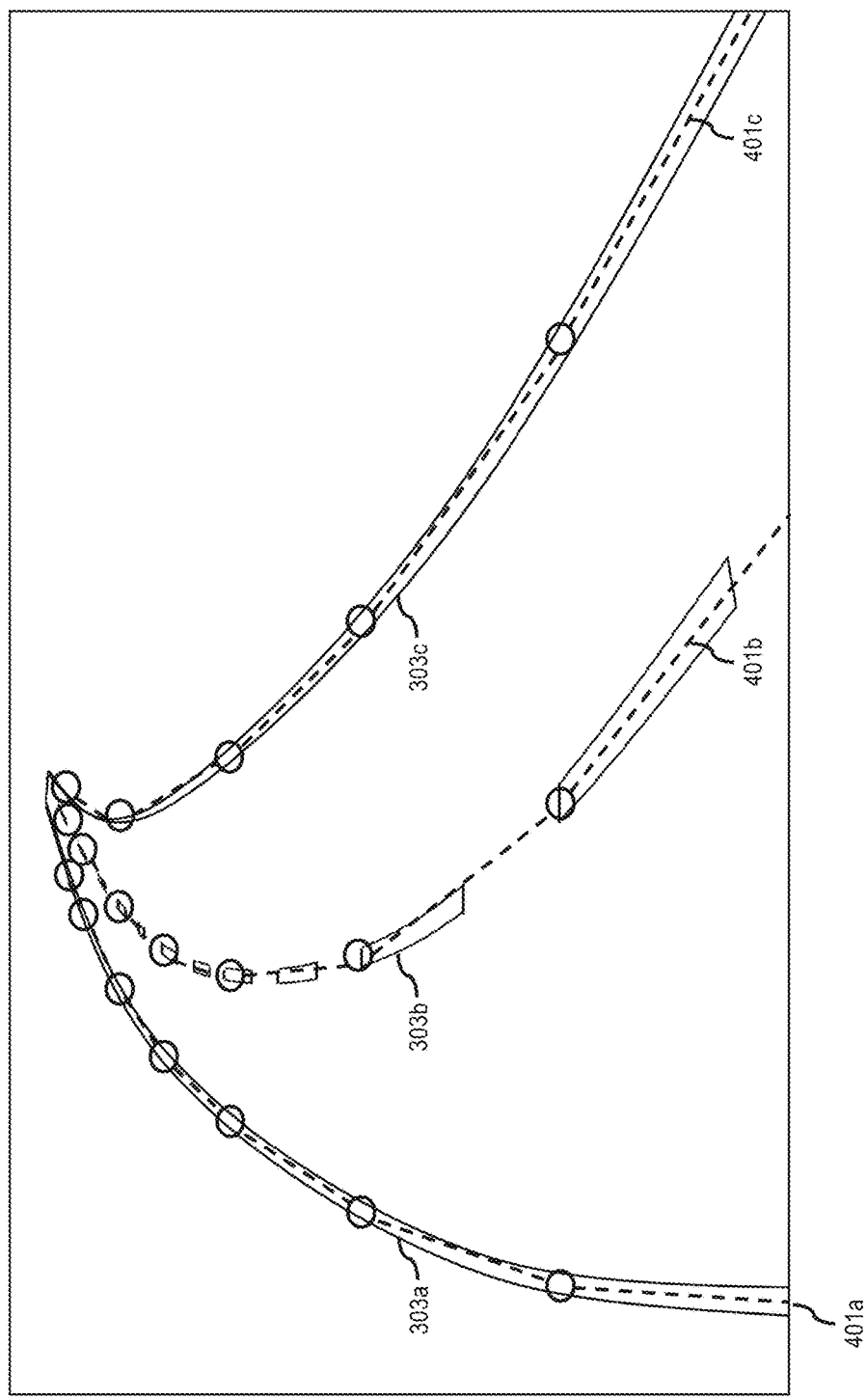
FIGS. 4A and 4B are diagrams illustrating polyline representations of lane features, according to one embodiment.

In one embodiment, as shown in FIG. 4A, lane models are typically represented as sets of polylines 401*a*-401*c*, in which the centerlines of the respective lanes 303*a*-303*c* are represented by piecewise-linear functions with an arbitrary number of points. In the example of FIG. 4A, the polylines 401*a*-401*c* represent each lane 303*a*-303*a* as a series of line segments (e.g., shown as dotted lines) with articulation points between the line segments indicated by circles. As previously noted, generating lane models from input images can include, but are not limited to, machine learning approaches using, for instance, neural networks to parametrically represent the lanes and compute associated confidence values (e.g., prediction confidence values).

Figure 4B:
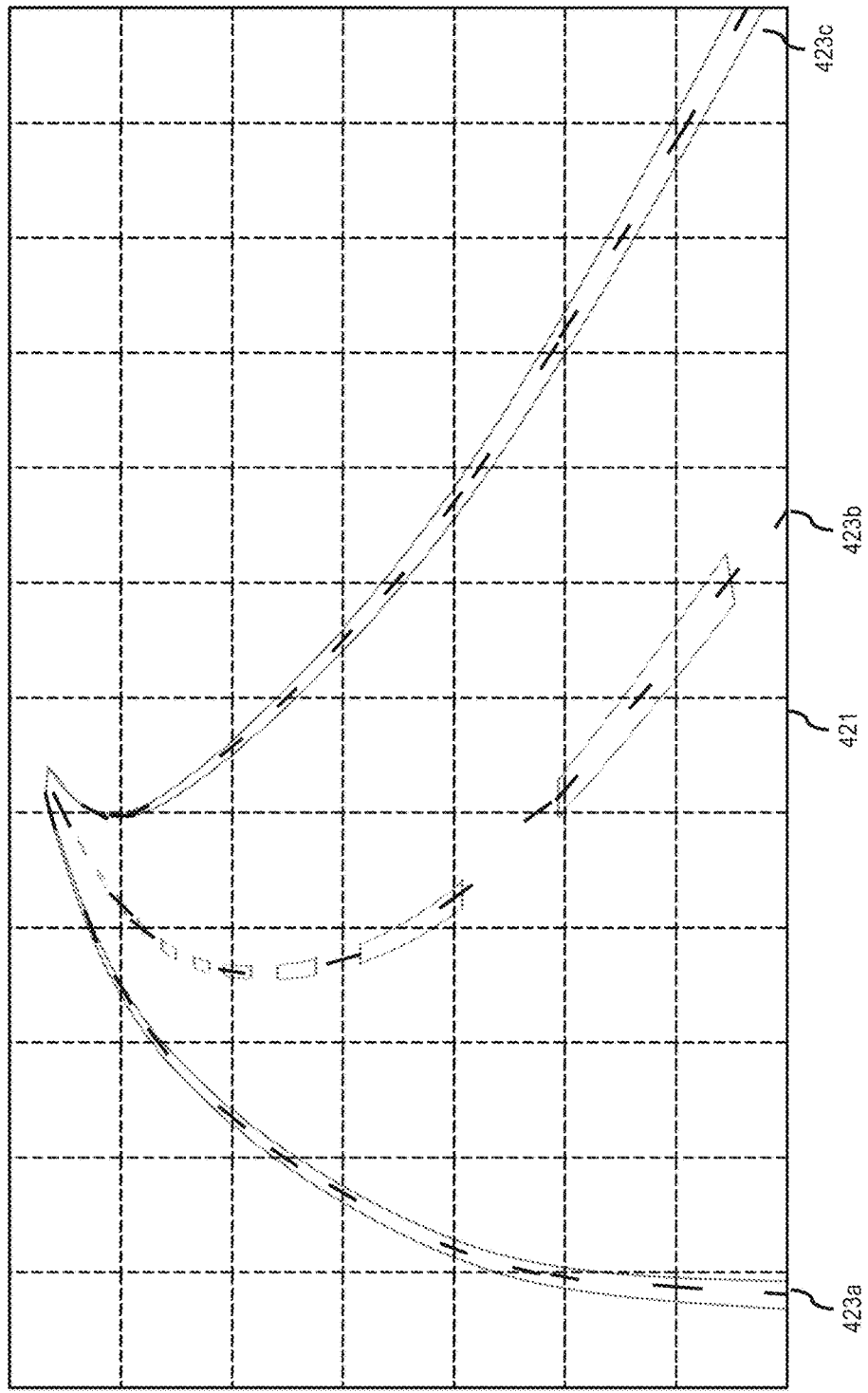

FIG. 4B illustrates an example of an approach for parametrically representing lane features using a neural network that can be used to estimate lane feature quality, according to one embodiment. For example, the approach of FIG. 4B uses a more natural representation of lane lines for a neural network that is based on a grid of squares overlaid with the input image as shown in the grid 501 of FIG. 5. In the example of FIG. 4B, a grid 421 segments the input image (e.g., the image as shown in FIG. 3) into individual grid cells. In one embodiment, such a grid can be output by a fully convolutional neural network, which has the advantage of being computationally fast without having an excess of parameters that might lead to overfitting. For example, with respect to a neural network or other similar parallel processing system, each of the grid cells can be processed by a different neuron or processing node to more efficiently employ the available neurons or nodes and distribute the computational load for processing the entire input image. In other words, in one layer of the neural network, the scope of each neuron corresponds to the extent of the input image area within each respective grid cell. Each neuron or node can make is prediction (e.g., detection of a lane line) for each individual grid cell including computing a prediction confidence for the cell. As a result of this segmentation, the basic unit of representation then becomes each cell of the grid, in which each lane line is parametrically encoded. The output of each cell can then be combined to create lane models 423*a*-423*c* to represent the detected lane features. Additional description of this example approach to detecting lane features is provided below with respect to FIGS. 10-12.

In step 203, after detecting lane features from input images as described above or using any equivalent approach, the lane quality platform 105 determines respective confidence values associated with a plurality of regions of the input image used to detect the lane features. The respective confidence values, for instance, represent a probability of predicting the lane features from each of the plurality of regions. In one embodiment, the plurality of regions includes a plurality of pixels, a plurality of cells, or a combination thereof. Regions, for instance, refers to any grouping of pixels of the input image, so that each region is processed as a group to detect any lane features in the particular region. As noted above, a computer vision system 103 can segment an input image into any number of regions for processing to recognize lane features. In one embodiment, the regions can be grid cells as described in the approach above, with each grid cell including any number of pixels (e.g., from 1 pixel to all pixels) of the input image.

Accordingly, in the example of FIG. 4B, the confidence values for regions of each image would be the prediction confidence values for each grid cell. For example, when the pixel(s) of a grid cell are processed by a machine learning classifier to recognize lane features, the classifier generally will output a classification for the grid cell (e.g., lane-feature detected or not detected) and a prediction confidence associated with the prediction (e.g., a confidence that a grid cell has lane features detected, or a confidence that a grid cell does not have lane features detected).

Table 1 below illustrates collating of the confidence values of the grid cells of the image used for lane feature detection. As shown in Table 1, the confidence values have been normalized to values spanning 0.0 to 1.0, with 0.0 indicating 0% probability or likelihood of the assigned classification and 1.0 indicating a 100% probability or likelihood of the assigned classification.

TABLE 1

| Grid Cell | Prediction Confidence | Classification |
| --- | --- | --- |
| 1 | 0.8 | Lane Feature Detected |
| 2 | 0.6 | Lane Feature Not Detected |
| 3 | 0.9 | Lane Feature Detected |
| 4. | 0.7 | Lane Feature Detected |
| . . . | . . . | . . . |
| N | 0.2 | Lane Feature Not Detected |

In step 205, after collating the confidence values for each region or grid cell, the lane quality platform 105 performs a classification of the plurality of regions (e.g., grid cells) into a plurality of confidence levels (e.g., two or more different bands of confidence levels) based on the respective confidence values computed for each grid cell. In other words, the lane quality platform 105 can group the grid cells or regions into different confidence levels that cover different ranges of confidence values. In one embodiment, to perform the classification, the lane quality platform 105 specifies a confidence threshold value at which to make the classification. The confidence threshold value delineates the respective grid cells based on the degree of confidence associated with the lane feature detections/predictions made from the portions of the input image corresponding to each grid cell or region.

In one embodiment, the classification is a binary classification between a high confidence level (e.g., regions or grid cells with confidence values above the confidence threshold) and a low confidence level (e.g., regions or grid cells with confidence values below the confidence threshold). In other words, the plurality of confidence levels used by the lane quality platform 105 includes a high confidence level for the plurality of regions associated with the respective confidence values equal to or greater than the confidence threshold value, and a low confidence level for the plurality of regions associated with the respective confidence values less than the confidence threshold value. In other embodiments, the lane quality platform 105 can use multiple confidence thresholds to create more than two confidence levels (e.g., low confidence, medium confidence, high confidence).

In step 207, the lane quality platform 105 determines the estimated quality of the lane features based on the classification of the plurality of regions. For example, the relative proportions of the grid cells at each confidence level can indicate the quality of the lane features detected in the input image. In one embodiment, the lane quality platform 105 computes a percentage of the plurality of regions that are classified into the high confidence level versus the low confidence value. In one embodiment, the percentage can be computed as a percentage of high confidence regions as a total of all high and low quality regions: e.g., % high confidence regions=(# of high confidence regions)/(total # of high and low confidence regions). The estimated quality of the lane features is then based on the computed percentage: e.g., Quality=% High Confidence Regions.

The embodiments of the approach to estimating lane feature quality described herein, for instance, are based on the observation that degradation of the physical or visual characteristics of lane features (e.g. lane markings, lane lines, Botts' dots, etc.) will be reflected in the prediction confidence for detecting those features in input images. As a result, variations in prediction confidence values (e.g., either decreased or increased confidence) can be correlated to a corresponding variation in the features or characteristics of the real-world lane markings or other features depicted in the input images.

In one embodiment, the lane quality platform 105 determines a variation of the estimated quality of the lane features over a distance domain (e.g., changes in estimated quality over different locations along a roadway), a temporal domain (e.g., changes in estimated quality over time), or a combination thereof. The lane quality platform 105 can also store the estimated quality of the lane features in association with a data record of the roadway in a geographic database (e.g., a geographic database 111 of the system 100). In this way, the estimated quality of lane features can be retrieved from as needed. In addition or alternatively, the lane quality platform 105 can compute the estimated quality of lane features in real-time as they are recognized by the system 100.

Figure 5A:
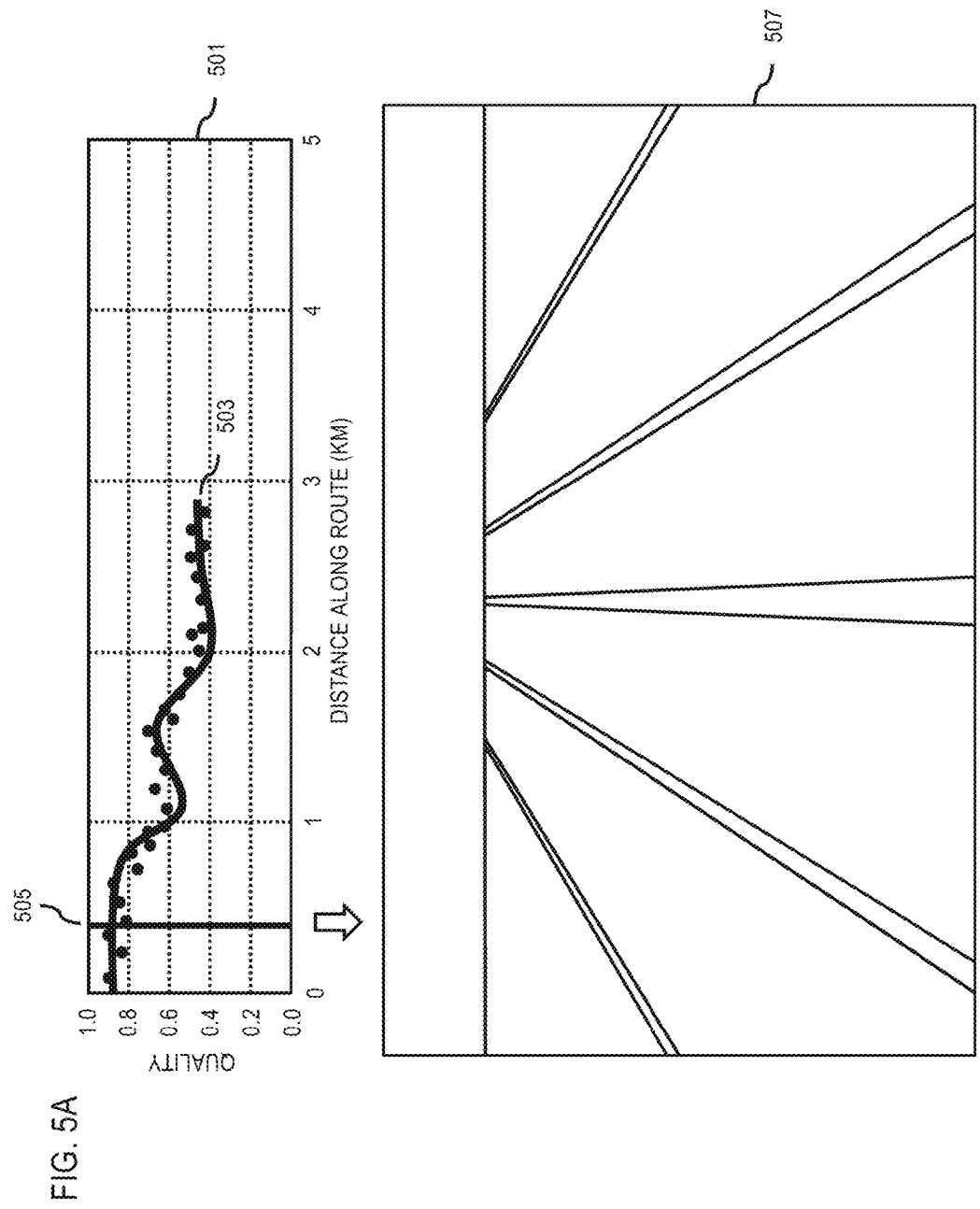

FIGS. 5A-5D are diagrams illustrating an example of a variability of lane quality across a distance domain, according to one embodiment. In the example of FIG. 5A, a vehicle 101 is driving along a route, and a graph 501 illustrates the estimated quality of the lane features detected over a distance along a route. As presented in the FIGS. 5A-5D, the estimated quality of the lane features are retrieved from the geographic database 111 for the vehicle 101's planned route. In this way, the driver and/or the vehicle 101 can have prior knowledge of expected changes in lane feature quality along the route. By way of example, the estimated quality of lane features that stored in the geographic database 111 can be computed from data reported by probe vehicles or other vehicles that have previously traveled the route. As shown in the graph 501, quality is computed as a percentage of high confidence regions as discussed above with respect to step 207. Each dot depicted in the graph 501 represents a separate input image (e.g., a video frame of a sequence of images captured from a camera mounted on the vehicle 101) processed to determine an estimated quality of lane features according to the various embodiments described herein.

The curved line 503 represents a curve fit to the point estimates of lane feature quality. The location 505 (e.g., represented by a vertical line in the graph 501) indicates the position along the route (e.g., at approximately 0.4 km) corresponding to the input image 507 used to compute the estimated quality of lane features at that location along the route. At this location, the quality is estimated at almost 0.9, indicating that the detected lane features of a high quality. In one embodiment, the quality is estimated based on the variability of the confidence scores of grid cells that are likely to have a predicted lane line. For example, a high confidence road will typically have a binary split between confidence values so that areas or grid cells without a detected road lane will have a confidence of 0, and areas with detected lanes will have a confidence of 1. As the road quality diminishes, more of the grid cells will have confidence values with intermediate values (e.g., 0.25 to 0.65, or some other range).

In one embodiment, the relative mix of the grid cells with low confidence levels (e.g., less than 0.25), intermediate confidence levels (e.g., 0.25 to 0.65), and high confidence levels (e.g., greater than 0.65) can be used to estimate the overall quality of the lane features. For example, the lane quality platform 105 can use at least the following two example processes for estimating the quality of lane features: (1) compute the estimated quality as the value of 1—(number of grid cells with intermediate confidence scores/number of grid cells with high confidence scores); or (2) compute the value of 1—variance of c (e.g., VAR(c)), where c is the set of confidence scores greater than a threshold value (e.g., a threshold of 0.15). It is noted that these two processes are provided by way of illustration and not as limitation. Accordingly, it is contemplated that any equivalent process can be used to express the relative ratio of the grid cells falling into different confidence intervals (e.g., low, intermediate, and/or high).

In the examples and embodiments described herein, the estimated quality of the lane features is illustrated a number between 0 and 1. However, any quality range or metric can be used according to the various embodiment described herein. Accordingly, in one embodiment, the lane quality platform 105 can compute additional statistics on the resulting lane quality score. For example, the lane quality platform 105 can compute and analyze the variance in lane confidence and the maximal value of lane confidence as additional indicators of lane feature quality. In one embodiment, in addition or as an alternate to graph-based representations (e.g., the graph 501), lane quality can be represented with a spatial component wherein regions of the input image are scored locally to create a heat map or equivalent representation so that the areas of low, intermediate, and/or high lane quality can be indicated as an overlay on the input image. In one embodiment, the lane quality score can be computed at a resolution or scale independent of the resolution of the input image.

As shown in the FIG. 5A, the high estimated lane quality of 0.9 is reflected in the image 507 of that location, which depicts sharp and visually distinct solid lane lines that provide clear visual features from which the computer vision system 103 can make a high confidence prediction.

In FIG. 5B, the vehicle 101 continues moving and approaches location 511 (e.g., approximately 0.9 km along the route). At location 511, the estimated quality of the lane feature has dropped slightly from the almost 0.9 at location 505 of FIG. 5A to approximately 0.8. The input image 513 depicts the lane markings at this location. As shown, the lane markings are now broken lines instead of solid lines. In this example, the change from a solid line to a broken line, may the predicted lane features slightly less certain, which is reflected in the estimated quality.

In FIG. 5C, the vehicle 101 continues further to location 521 (e.g., approximately 1.4 km along the route). At location 521, the estimated quality of the lane feature has dropped more significantly to slightly above 0.6. As shown in the corresponding input image 523, the lane markings at this location 521 are Botts' dots instead of lane lines (e.g., broken or solid). Botts' dots are relatively small round pavement markers that can be challenging to for the system 100 to recognize, which is reflected by the lower estimated quality score.

In FIG. 5D, the vehicle 101 continues further to location 531 (e.g., approximately 2.5 km along the route). At location 531, the estimated quality of the lane feature dropped further to approximately 0.5. As shown in the corresponding input image 533, the lane markings remain Botts' dots, but the dots are now present at a lower density, which leads to a further decrease of the estimated quality of the lane markings.

Figure 6:
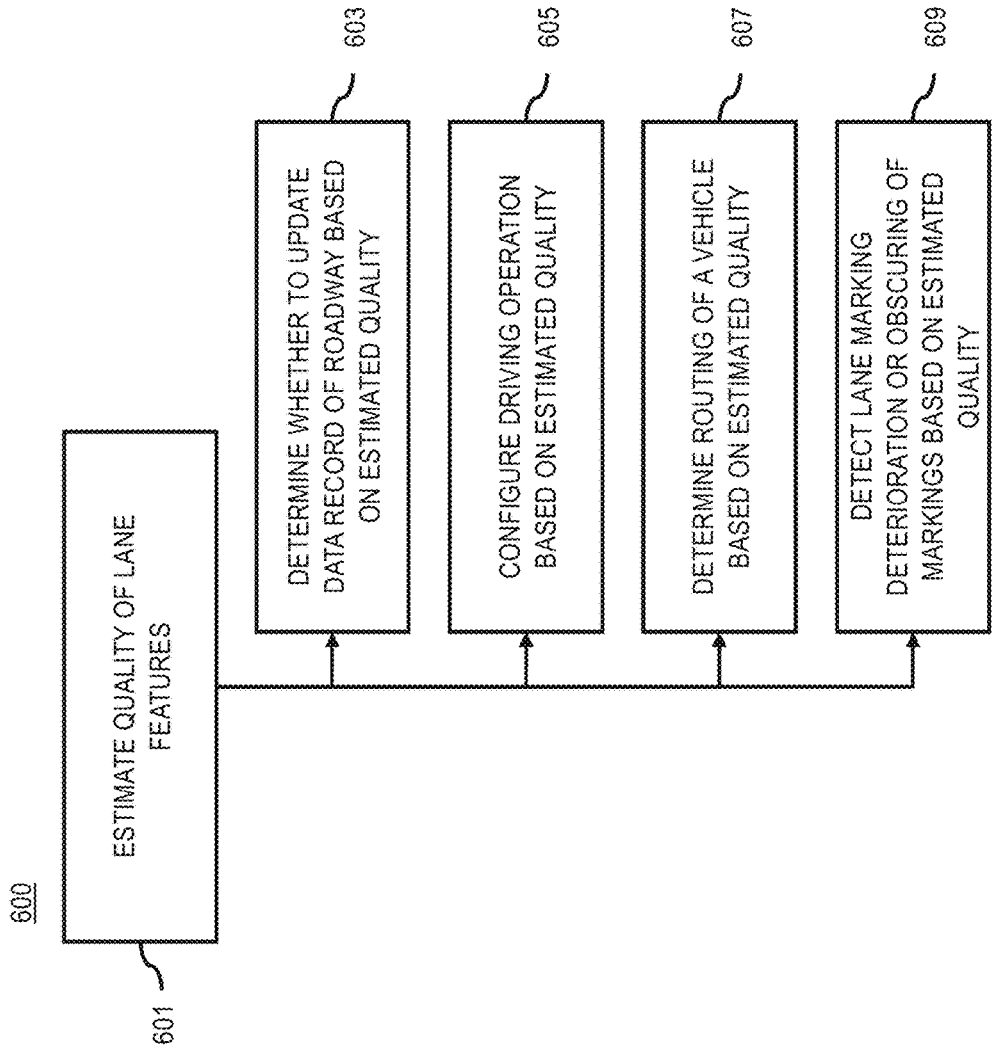
FIG. 6 is a flowchart of a process for initiating mapping or navigation related functions based on an estimated quality of lane features, according to one embodiment.

FIG. 6 is a flowchart of a process for initiating mapping or navigation related functions based on an estimated quality of lane features, according to one embodiment. In one embodiment, the lane quality platform 105 and/or the computer vision system 103 may perform one or more portions of the process 200 and may be implemented in, for instance, a chip set including a processor and a memory as shown in FIG. 14. As such, the lane quality platform 105 and/or the computer vision system 103 can provide means for accomplishing various parts of the process 200. In addition or alternatively, a services platform 107 and/or one or more services 109a-109n (also collectively referred to as services 109) may perform any combination of the steps of the process 200 in combination with the lane quality platform 105 and/or the computer vision system 103, or as standalone components. Although the process 200 is illustrated and described as a sequence of steps, it is contemplated that various embodiments of the process 200 may be performed in any order or combination and need not include all of the illustrated steps.

In one embodiment, the process 600 provides optional steps or functions that can be performed using data on the quality of lane features estimated according to the various embodiments described herein. It is noted that the functions described in the process 600 are provided by way of illustration and not as limitations. Accordingly, in step 601, the lane quality platform 105 computes or retrieves an estimated quality of lane features detected in an input image according to the process 200 of FIG. 2.

In step 603, the lane quality platform 105 determines whether to update a data record of the roadway with the lane features based on the estimated quality of the lane features. In one embodiment, the detected lane features may represent new features (e.g., new lanes, new roadways, etc.) or updated features (e.g., changes to lane configuration, repainting of lane lines, etc.) that can be used to add or update the corresponding data records in the geographic database 111. In one embodiment, the lane quality platform 105 can determine whether the detected lane features meet a predetermined quality threshold before making the addition or update to the geographic database 111. In another embodiment, the lane quality platform 105 can determine if the estimated quality of a potential update differs from the estimated quality of the currently stored record by more than a threshold value. When it does, the lane quality platform 105 can update the record or take other action to resolve the discrepancy (e.g., sending a crew to manually inspect the affected location).

In step 605, the lane quality platform 105 configures a driving operation of an autonomous vehicle based on the estimated quality when the autonomous vehicle approaches or travels on the roadway. As described above, highly accurate and precise localization can be needed to support autonomous operation of a vehicle. In cases, where localization against lane markings is used, the lane quality platform 105 can signal to an autonomous vehicle (e.g., a vehicle 101) to exit autonomous mode and revert manual control to the driver when the estimated lane quality is such that lane-based localization to a desired level of accuracy or precision is not available, or vice versa. Alternatively, actions other than reverting to manual control can be initiate in response to the estimated quality (e.g., activating alternative localization means, decreasing speed, etc.).

In step 607, the lane quality platform 105 determines a routing of a vehicle through the roadway based on the estimated quality. In one embodiment, the lane quality platform 105 can interact with vehicles 101 to reroute them to avoid areas with estimated lane feature quality below a threshold value. In one embodiment, the rerouting can occur dynamically in real-time (e.g., when performing real-time lane quality estimation) or when a navigation route is requested using pre-stored lane quality data.

Figure 7:
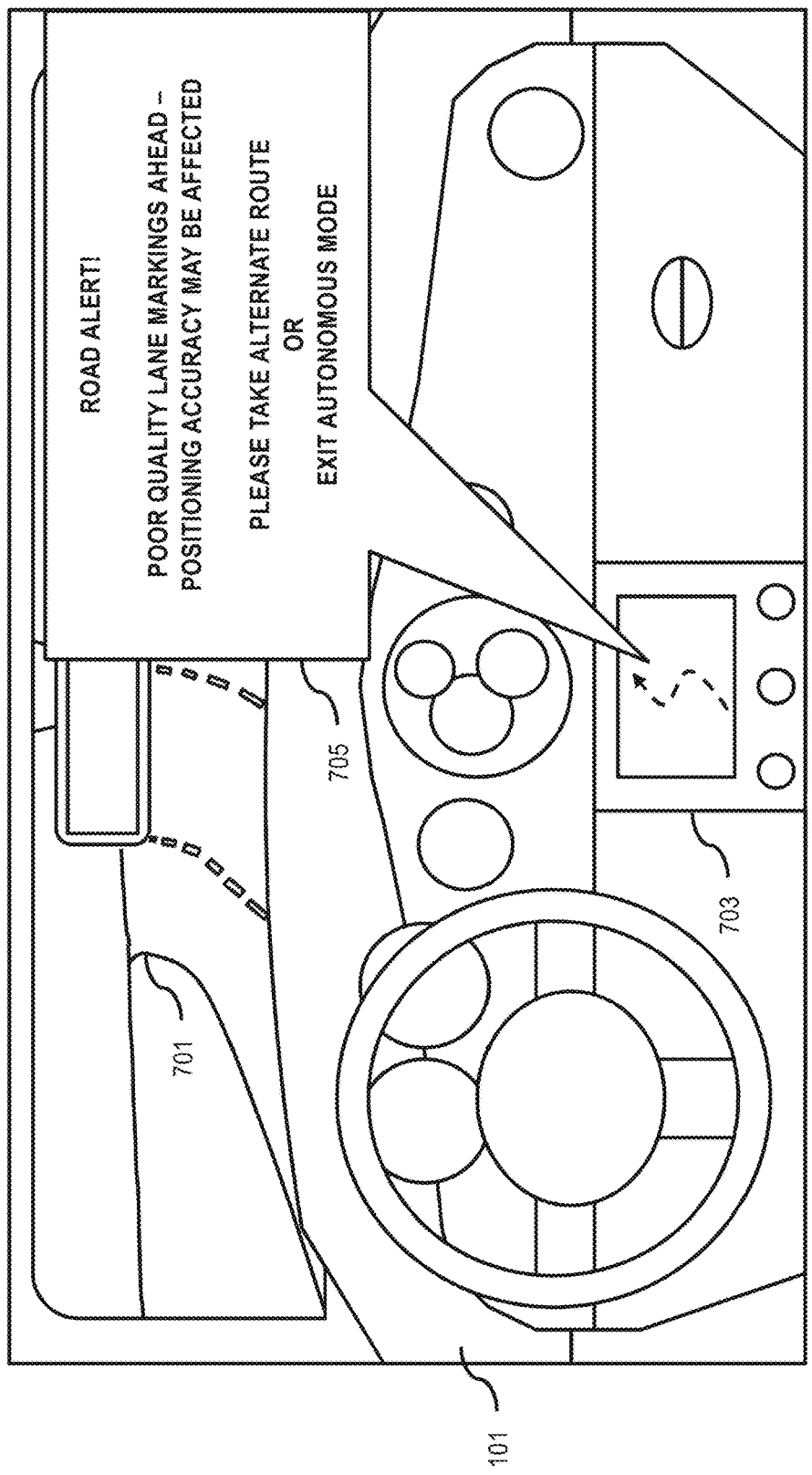
FIG. 7 is diagram illustrating an example vehicle navigation system that can initiate functions based on an estimated quality of lane features, according to one embodiment.

FIG. 7 is diagram illustrating an example vehicle navigation system that can initiate functions based on an estimated quality of lane features, according to one embodiment. In the example, of FIG. 7, the vehicle 101 is traveling along a roadway 701 in fully autonomous mode using a navigation/vehicle control system 703 configured to estimate lane feature quality according to the various embodiments described herein. In this example, the system 703 (e.g., interacting with the lane quality platform 105) detects that the vehicle 101 is approaching a segment of the roadway 701 that has poor quality lane markings (e.g., lane markings with quality below a threshold value). In response, the system 703 presents an alert message 705 to the driver indicating "Road Alert! Poor quality lane markings ahead—positioning accuracy may be affected" and providing the driver with an option to reroute to continue in autonomous mode or to exit autonomous mode to take manual control of the vehicle 101.

In step 609, the lane quality platform 105 stores a history of the estimated quality of the lane features for the roadway. The lane quality platform 105 then detects a deterioration of paint used to mark the lane features, a condition that obscures or occludes the lane features, or a combination thereof based on the history of the estimated quality. In other words, the lane quality platform 105 can compare variability of the estimated quality for a given location over a time domain to see changes in variability over time.

FIG. 8A illustrates an example of monitoring lane quality over time to determine lane paint deterioration, according to one embodiment. In the example of FIG. 8A, a graph 801 depicts the change in estimated quality for a particular location on a roadway over a period of 12 months. At time 0 months, the estimated quality of lane features is approximately 0.8. The input image 803 corresponding to this time at the location shows lane well defined and clear lane markings. Over a period of twelves, the estimated quality slow declines so that at time 12 months, the estimated quality has dropped significantly to approximately 0.5. The input image 805 corresponding to 12 months, shows that the lane markings are now heavily faded, thereby reducing the confidence with which the system 100 can detect lane lines and the overall estimated quality of the lane features. In this example, normal wear and tear has reduced the visibility and quality of the painted lane markings at the location. In one embodiment, the lane quality platform 105 can record the history of the estimated quality over a period of time to compare against ground truth patterns reflecting lane paint wear over time. If the observed pattern for roadway matches the reference or ground truth wear pattern (e.g., matching shape of the quality curve, slope of the quality curve, etc.), then paint wear can be detected.

Figure 8B:
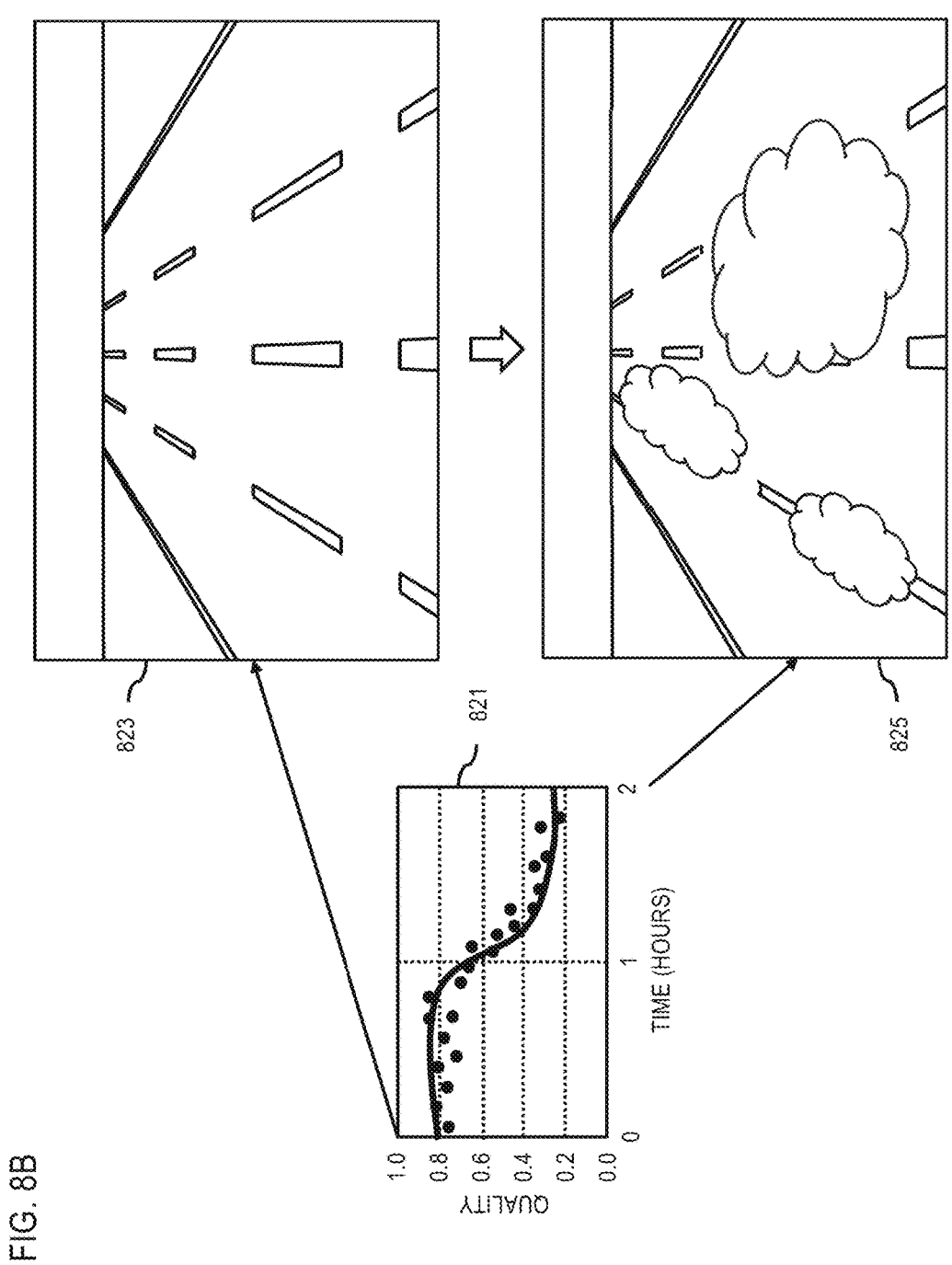

FIG. 8B illustrates an example of monitoring lane quality over time to determine lane occlusions, according to one embodiment. More specifically, FIG. 8B depicts another example use case for monitoring estimated lane feature quality at a particular location of a time domain. In this example, a group 821 depicts the change in estimated quality for a particular location or roadway of a relatively short period of time (e.g., 2 hours). This short period of time enables the lane quality platform 105 to detect lane occlusion events that can happen over relatively short periods of time (e.g., when lane markings become covered with snow, dirt, debris, etc.). The graph 821, for instance, shows beginning at time 0 hours, the estimated lane quality is high (e.g., 0.8) and relatively constant until approximately 1 hour. At the 1 hour point, the estimated lane feature quality for this road segment begins to decline over a half period to a low quality level (e.g., 0.3). The input image 823 at time 0 hours shows that the lane markings are clear and visible. However, the input image 825 at time 2 hours shows that the lane markings are now significantly occluded by snow. This occlusion, in turns, makes is difficult for the system 100 to recognize the lane features because the lane markings are not clearly visible. Accordingly, the estimated quality of the lane features decreases along with the prediction confidence. As with the paint deterioration example, in one embodiment, the lane quality platform 105 can use the determine timing and pattern of estimated quality variation over time to correlate the quality loss to specific causal events (e.g., snow, weather, etc.)

Returning to FIG. 1, as shown, the system 100 includes the lane quality platform 105 for estimating the quality of the lane feature according the various embodiments described herein. In addition, the system 100 includes the computer vision system 103 configured to detect lane lines in an input image and associated prediction confidence values, according to the various embodiments described herein. In one embodiment, the computer vision system 103 includes a neural network or other machine learning/parallel processing system to automatically detect features such as lane lines in image data to support localization of, e.g., a vehicle 101 within the sensed environment. In one embodiment, the neural network of the computer vision system 103 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the computer vision system 103 also has connectivity or access to a geographic database 111 which representations of mapped geographic features to facilitate video odometry to increase localization accuracy. The geographic database 111 can also store parametric representations of lane lines and other similar features and/or related data generated or used to encode or decode parametric representations of lane lines according to the various embodiments described herein.

In one embodiment, the computer vision system 103 has connectivity over a communication network 113 to the services platform 107 that provides one or more services 109. By way of example, the services 109 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 109 uses the output of the lane quality platform 105 (e.g., estimated lane feature quality) and/or of the computer vision system 103 (e.g., detected lane features) to localize the vehicle 101 or a user equipment 115 (e.g., a portable navigation device, smartphone, portable computer, tablet, etc.) to provide services 109 such as navigation, mapping, other location-based services, etc.

In one embodiment, the lane quality platform 105 may be a platform with multiple interconnected components. The lane quality platform 105 may include multiple servers, intelligent networking devices, computing devices, components and corresponding software for providing parametric representations of lane lines. In addition, it is noted that the lane quality platform 105 and/or the computer vision system 103 may be a separate entity of the system 100, a part of the one or more services 109, a part of the services platform 107, or included within the UE 115 and/or vehicle 101.

In one embodiment, content providers 117a-117m (collectively referred to as content providers 117) may provide content or data (e.g., including geographic data, parametric representations of mapped features, etc.) to the geographic database 111, the lane quality platform 105, the computer vision system 103, the services platform 107, the services 109, the UE 115, the vehicle 101, and/or an application 119 executing on the UE 115. The content provided may be any type of content, such as map content, textual content, audio content, video content, image content, etc. In one embodiment, the content providers 117 may provide content that may aid in the detecting and classifying of lane lines and/or other features in image data, and estimating the quality of the detected features. In one embodiment, the content providers 117 may also store content associated with the geographic database 111, lane quality platform 105, computer vision system 103, services platform 107, services 109, UE 115, and/or vehicle 101. In another embodiment, the content providers 117 may manage access to a central repository of data, and offer a consistent, standard interface to data, such as a repository of the geographic database 111.

In one embodiment, the UE 115 and/or vehicle 101 may execute a software application 119 to collect, encode, and/or decode lane feature data detected in image data to estimate the quality of the lane features according the embodiments described herein. By way of example, the application 119 may also be any type of application that is executable on the UE 115 and/or vehicle 101, such as autonomous driving applications, mapping applications, location-based service applications, navigation applications, content provisioning services, camera/imaging application, media player applications, social networking applications, calendar applications, and the like. In one embodiment, the application 119 may act as a client for the lane quality platform 105 and/or the computer vision system 103 and perform one or more functions associated with estimating the quality of lane features alone or in combination with the lane quality platform 105.

By way of example, the UE 115 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.). In one embodiment, the UE 115 may be associated with the vehicle 101 or be a component part of the vehicle 101.

In one embodiment, the UE 115 and/or vehicle 101 are configured with various sensors for generating or collecting environmental image data (e.g., for processing the lane quality platform 105 and/or computer vision system 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 115 and/or vehicle 101 may include GPS or other satellite-based receivers to obtain geographic coordinates from satellites 121 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the lane quality platform 105, computer vision system 103, services platform 107, services 109, UE 115, vehicle 101, and/or content providers 117 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
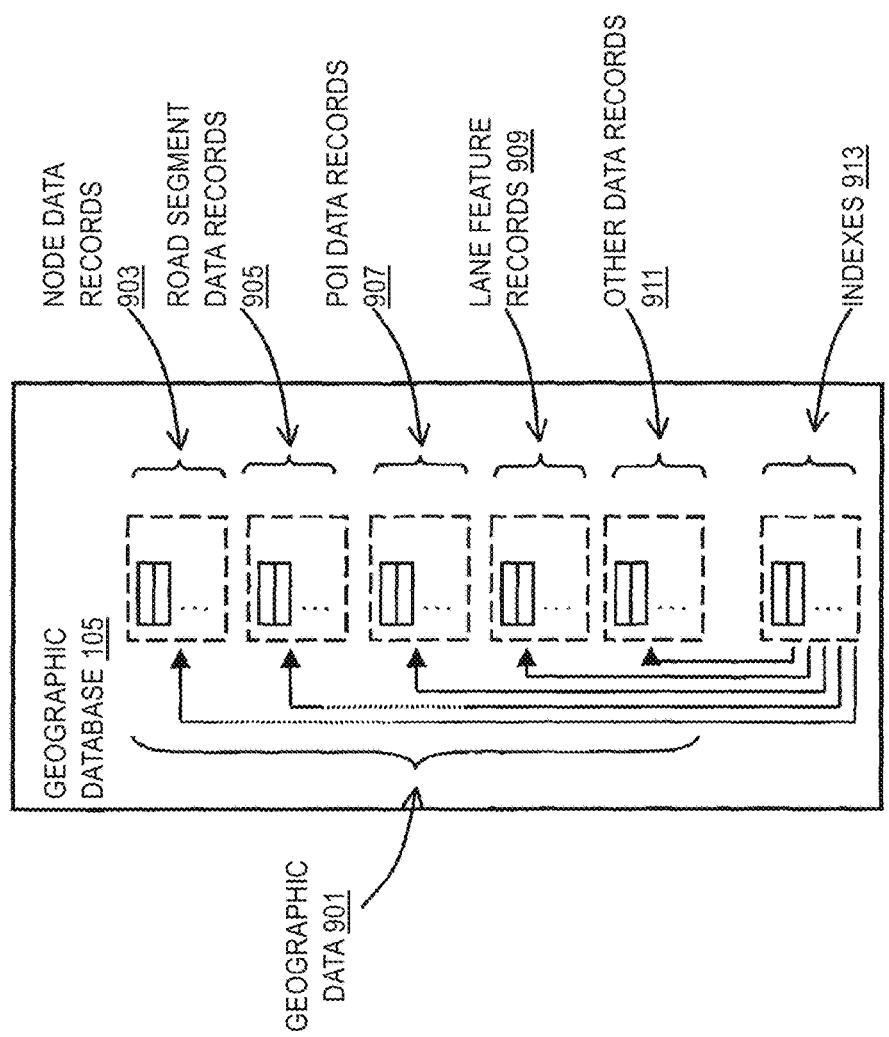
FIG. 9 is a diagram of a geographic database, according to one embodiment.

FIG. 9 is a diagram of a geographic database, according to one embodiment. In one embodiment, the geographic database 111 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 903, road segment or link data records 905, POI data records 907, lane feature records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 111. In one embodiment, the indexes 913 may be used to quickly locate data without having to search every row in the geographic database 111 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 907. The geographic database 111 can also include data about places, such as cities, towns, or other communities, and other geographic features, such as bodies of water, mountain ranges, etc. Such place or feature data can be part of the POI data records 307 or can be associated with POIs or POI data records 907 (such as a data point used for displaying or representing a position of a city).

In one embodiment, the geographic database 111 can also include lane feature records 909 for storing the lane lines (e.g., parametric representations of lane lines) detected from input image data according to the various embodiments described herein. In one embodiment, the geographic database 111 can also store the confidence values and the estimated quality of the detected lane features. By way of example, the lane feature records 909 can be associated with one or more of the node records 903, road segment records 905, and/or POI data records 907 to support localization or video odometry based on the features stored therein and the corresponding estimated quality of the features. In this way, the parametric representation records 909 can also be associated with the characteristics or metadata of the corresponding record 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 117 in association with the services platform 107 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 115) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 10:
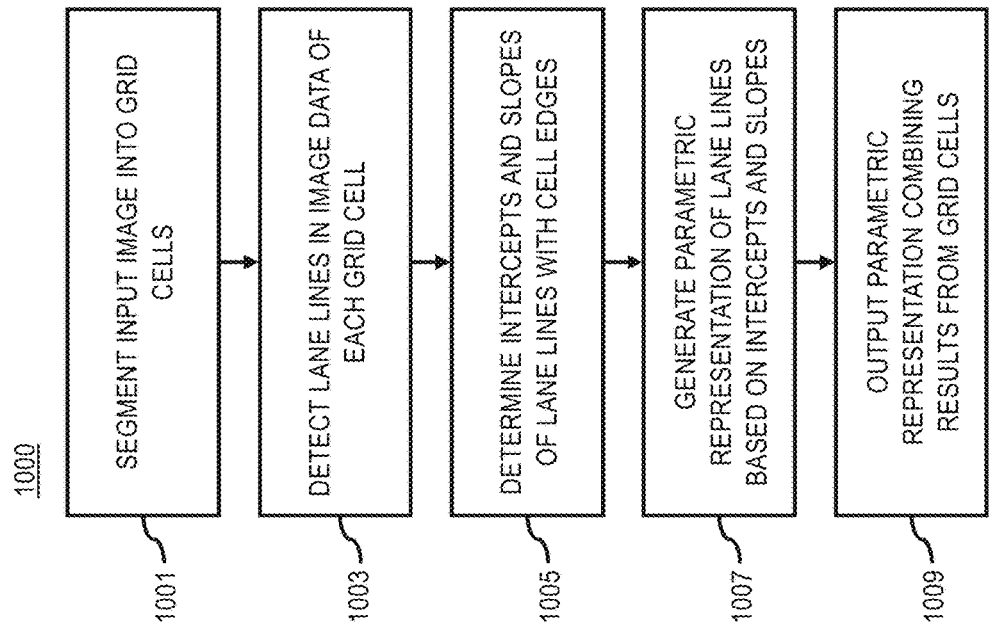
FIG. 10 is a flowchart of a process for generating a parametric representation of lane lines detected in an input image, according to one embodiment.

FIG. 10 is a flowchart of a process for generating a parametric representation of lane lines detected in an input image, according to one embodiment. In one embodiment, the computer vision system 103 and/or the lane quality platform 105 may perform one or more portions of the process 1000 and may be implemented in, for instance, a chip set including a processor and a memory as shown in FIG. 14. As such, the computer vision system 103 and/or the lane quality platform 105 can provide means for accomplishing various parts of the process 1000. In addition or alternatively, the services platform 107 and/or services 109 may perform any combination of the steps of the process 1000 in combination with the computer vision system 103/ the lane quality platform 105 or as standalone components. Although the process 1000 is illustrated and described as a sequence of steps, it is contemplated that various embodiments of the process 1000 may be performed in any order or combination and need not include all of the illustrated steps.

In step 1001, the computer vision system 103 segments an input image into a plurality of grid cells. As previously discussed, the input image can be part of an image capture stream (e.g., from an onboard camera of a vehicle 101) to support video odometry to more accurately localize the vehicle 101 (e.g., localized to within 10 cm accuracy). In one embodiment, the grid is comprised of regular shapes (e.g., square, rectangle, etc.), but it is contemplated that grid can also vary in size and/or shape from cell to cell. For example, in areas where higher resolution is needed (e.g., in the center of an image), smaller cells can be used to provide greater resolution. Similarly, larger cells can be used for the periphery of an image, where greater resolution may not be needed.

In one embodiment, the resolution or size of the grid can vary with available processing power and/or desired accuracy/preciseness of the resulting lane models. As previously discussed, in one embodiment, the grid resolution is at a relatively low level (e.g., 50×38).

In step 1003, the computer vision system 103 processes a portion of the input image in each of the plurality of grid cells to detect one or more lane lines in said each grid cell. In one embodiment, the computer vision system 103 assigns the processing of said each grid cell or the generating of the parametric representation of said each grid cell to a different processing node of the computer vision system. For example, in a neural network, the portion of the image data falling within a grid cell represent the receptive field for a given collection of neurons. These neurons can then use machine learning to automatically detect lane lines within the image and compute the confidence levels (e.g., prediction confidence) for the detected features. In one embodiment, the computer vision system 103 comprises a convolutional neural network, and the generating of the parametric representation is completed in one forward pass of the convolutional neural network.

In step 1005, the computer vision system 103 determines one or more intercepts of the one or more lane lines with one or more edges of said each grid cell, and one or more slopes of the one or more lane lines at the one or more intercepts for said each grid cell in which the one or more lane lines are detected. In one embodiment, the center line of the detected lanes can be used to determine the edge intercepts and slopes for each grid cell. It is contemplated that the computer vision system 103 can use any coordinate system, measurement unit, and/or scale to define the intercepts and slopes of the line at the intercepts.

In step 1007, the computer vision system 103 generates a parametric representation of the one or more lane lines for said each grid cell, wherein the parametric representation encodes the one or more intercepts and the one or more slopes into a data structure for said each grid cell. In one embodiment, the parametric representation of the data structure includes: (1) an indicator value parameter for each of the one or more edges to indicate which of the one or more edges of said each grid cell the one or more intercepts cross, (2) a slope parameter to indicate a slope of the one or more lane lines at the one or more intercepts, and/or (3) an intercept parameter to indicate a position along the one or more edges at which the one or more intercept occurs. In one embodiment, the indicator value parameter represents a probability that the one or more lanes is predicted to cross at the one or more intercepts when the computer vision system is operating in a prediction mode. One example of this data structure or parametric representation is discussed with respect to FIG. 6 above.

In one embodiment, the computer vision system 103 can optionally determine that there are a plurality of the one or more lane lines detected for said each grid cell. The computer vision system 103 then generates the parametric representation for each of the plurality of the one or more lane lines, and outputs the parametric representation for said each of the plurality of the one or more lane lines as a different set of output channels. In one embodiment, the computer vision system 103 can be configured with a maximum number of lane lines that it is to detect in a given grid cell. This maximum number can then be used to determine the number of output channels to allocate to the parametric representation. For example, in the example discussed above, a parametric representation of a line can have 12 parameters in one set to describe a single lane line. Accordingly, the number of output channels to allocate be the maximum number lane lines to detect multiplied by the number of parameters in a set.

In one embodiment, the parametric representation can be extended with additional classes and/or attributes to describe a detected lane line. For example, the parametric representation further includes an attribute parameter indicating a lane line type. This lane type can include a description class or attribute of the lane line such as whether the lane line is a solid lane line type or a dashed lane line type. In one embodiment, the lane type can be determined directly from the input image. For example, the computer vision system 103 can identify whether a lane consists of a solid line or a dashed line based on recognized visual features in the input image. In addition or alternatively, the lane type can be inferred or determined from the geographic database 111. For example, the computer vision system 103 can query the database to identify the lane type based on the current coordinates of the vehicle 101 (e.g., as determined from GPS, video odometry, and/or any other available localization technique).

In step 1009, the computer vision system 103 provides an output parametric representation for the input image, wherein the output parametric representation aggregates the parametric representations of said each grid cell. In other words, the computer vision system 103 can aggregate the parametric representation of lane lines in each grid cell into an output parametric representation that encompasses the entire input image. This collection of the basic representation units at the grid cells can then represent the overall geometry of lane lines or lane models.

Figure 11:
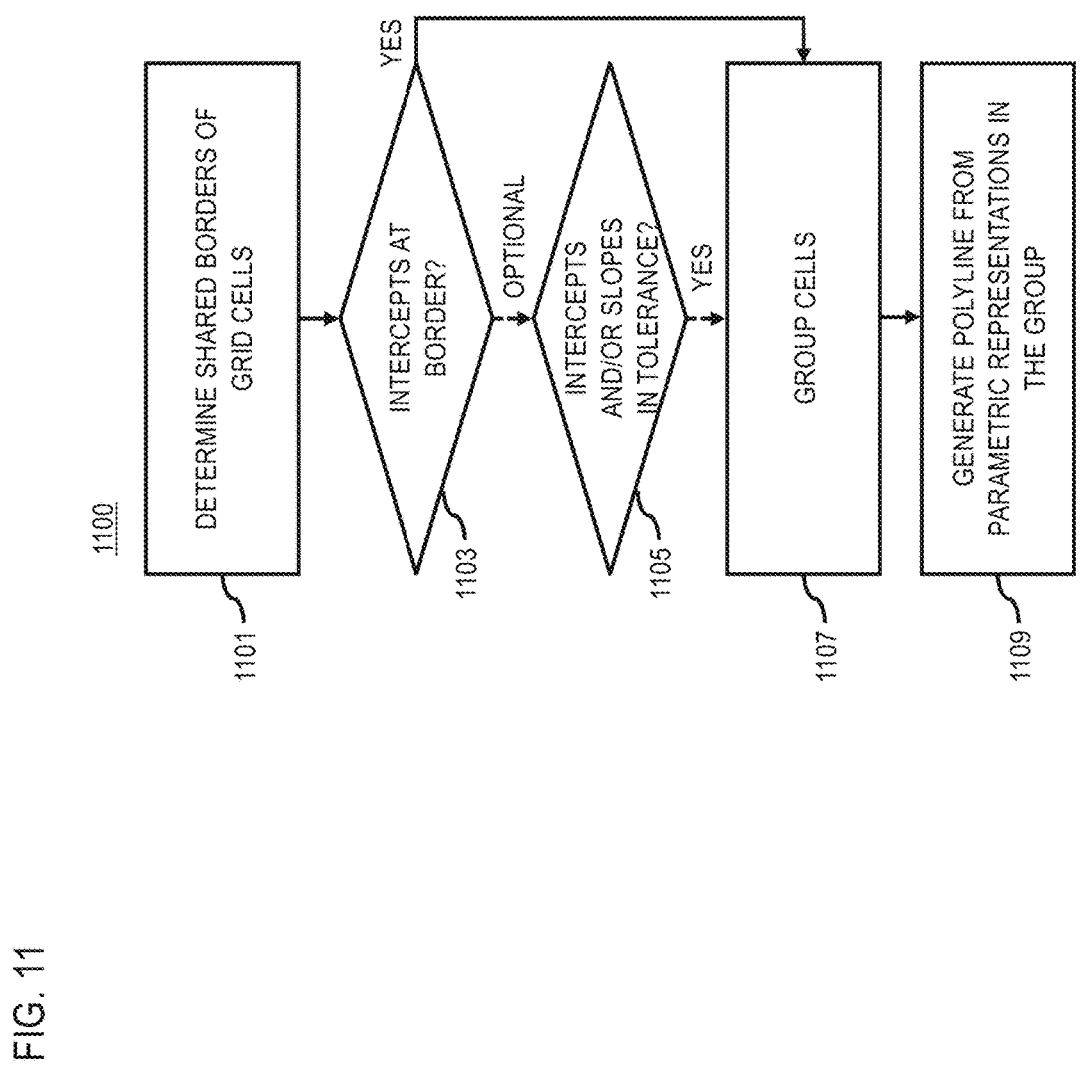
FIG. 11 is a flowchart of a process for grouping grid cells based on their respective parametric representations of lane lines, according to one embodiment.

FIG. 11 is a flowchart of a process for grouping grid cells based on their respective parametric representations of lane lines, according to one embodiment. In one embodiment, the computer vision system 103 and/or the lane quality platform 105 may perform one or more portions of the process 1100 and may be implemented in, for instance, a chip set including a processor and a memory as shown in FIG. 14. As such, the computer vision system 103 and/or the lane quality platform 105 can provide means for accomplishing various parts of the process 1100. In addition or alternatively, the services platform 107 and/or services 109 may perform any combination of the steps of the process 1100 in combination with the computer vision system 103/the lane quality platform 105 or as standalone components. Although the process 1100 is illustrated and described as a sequence of steps, it is contemplated that various embodiments of the process 1100 may be performed in any order or combination and need not include all of the illustrated steps.

In one embodiment, the process 1100 is performed following the creation of the parametric representations of at least some or all of the grid cells as described with respect to the process 1000 of FIG. 10.

In step 1101, the computer vision system 103 determines shared borders of grid cells. By way of example, a shared border of occurs at an edge of a first grid cell that is immediately adjacent or overlaps a corresponding edge of an adjacent second grid cell. Accordingly, in one embodiment, at each shared border of said each grid cell in the output parametric representation, the computer vision system 103 can look for cells with two edges with large indicator values (step 1103) and join the intercepts or simply group the cells (step 1107). For example, a "large indicator" value refers to a predicted or detected lane line for which the computer vision system 103 has predicted a probability of crossing the edge that is above a threshold probability. In other words, when two cells share a common border and each of the two cells has an intercept on the edge at the common border, then the two intercepts or cells can be joined into a common lane line if the indicator value is above the probability threshold.

In addition or alternatively, the computer vision system 103 combines two of said each grid cells (step 1107) when the one or more intercepts, the one or more slopes, a confidence value associated with the one or more intercepts, or a combination thereof for said two of said each grid cells are within a tolerance value (step 1105). In this embodiment, instead of relying on just the indicator value to join or group cells as discussed above, the computer vision system 103 can evaluate whether two adjacent intercepts occur at the same position along the shared border within a tolerance level (e.g., a threshold distance) and/or whether the slopes of the two intercepts also match to within a tolerance level (e.g., a threshold degree of variance). If the intercepts and/or slopes match within the tolerance level, then the intercepts or cells or joined into a group.

In one embodiment, a group of said each grid cells resulting from the combining represents a given lane line. In other words, the computationally cheap act of comparing intercepts and/or slopes at shared cell borders can result in building a lane model that advantageously does not require a fully connected layer of a neural network.

In step 1109, the computer vision system 103 processes the one or more lane lines detected in said each grid cell in the group to generate a polyline representing of a lane model of the given lane.

Figure 12:
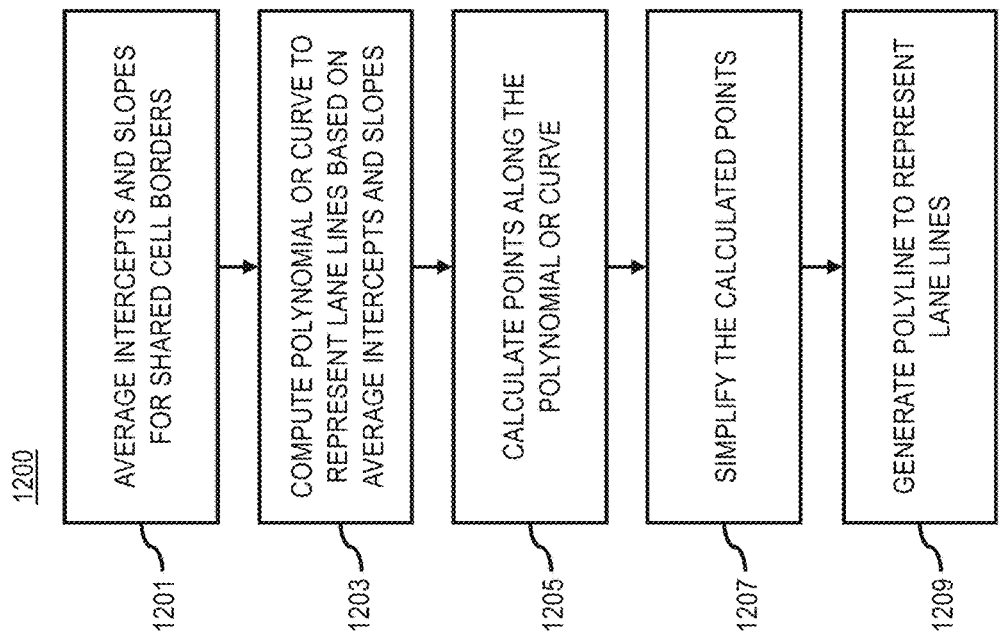
FIG. 12 is a flowchart for decoding parametric representations of lane lines into polylines, according to one embodiment.

FIG. 12 is a flowchart for decoding parametric representations of lane lines into polylines, according to one embodiment. In one embodiment, the computer vision system 103 and/or the lane quality platform 105 may perform one or more portions of the process 1200 and may be implemented in, for instance, a chip set including a processor and a memory as shown in FIG. 14. As such, the computer vision system 103 and/or the lane quality platform 105 can provide means for accomplishing various parts of the process 1200. In addition or alternatively, the services platform 107 and/or services 109 may perform any combination of the steps of the process 1200 in combination with the computer vision system 103/the lane quality platform 105 or as standalone components. Although the process 1200 is illustrated and described as a sequence of steps, it is contemplated that various embodiments of the process 1200 may be performed in any order or combination and need not include all of the illustrated steps.

The process 1200 describes an embodiment of a process for decoding grouped parametric representations of lane lines to generated lane models as described in step 1109 of the process 1100 above. Accordingly, in one embodiment, the process 1200 is performed following the process 1000 of FIG. 102 and the process 1100 of FIG. 11. One advantage of this decoding approach is that once a parametric representation of a lane line is generated for each grid cell, no further image analysis is needed to manipulate or otherwise decode the lane lines. This, in turn, results in a significant reduction of computational resources needed from create the lane models.

In step 1201, the processing of the one or more lane lines comprises averaging the one or more slopes, the one or more intercepts, or a combination thereof for said each shared border in the group. As previously discussed, the different intercept and slope results generated by each adjacent cell of shared border represents duplicate information of the detected lane line edge crossing. As a results, averaging the duplicate information or values can advantageously improve the accuracy of the predicted lane lines.

In step 1203, the computer vision system 103 determines a curvature of the one or more lane lines in said each grid cell based on an input slope and an output slope of the one or more slopes at the one or more intercepts. For example, there are typically two intercepts at two different edges or each grid cell in which a lane line is detected. These two intercepts and their respective slopes can be used to parametrically describe the shape of the lane line shape within the cell without actually have to store any data points about the line other than the intercepts and slope. In other words, no data from the interior of the grid cell is needed. Instead, the computer vision system 103 can compute a curve that encompasses the intercepts with the curvature based on the slopes of the intercepts. This curve can be based on computing, for instance, a Hermite polynomial, Bezier curve, and/or the like.

Once the curve is determined, the computer vision system 103 can initiate the process or converting the curve representations into a polyline or other vector-based representation of the lane lines. At step 1205, for instance, the computer vision system 103 uses the determined curves to calculate an excess number of points along the curve. As described above, the excess or large number points is a number that is greater than needed to as junction points of a polyline or vector-based representation of the lane line.

At step 1207, the computer vision system 103 can simplify the point representation of the lane lines by removing any points from the excess points that are not needed to delineate the polyline or vector-based representation to a predetermined accuracy and/or precision. This simplification process can be performed using any algorithm for simplifying curves such as the Ramer-Douglas-Peucker algorithm. The computer vision system 103 then uses the simplified point representation to generate the polyline or vector-based representation of the lane lines by connecting line segments between the remaining points with the remaining points acting as junction points. An example of the resulting polyline is illustrated in the example of FIG. 4A above.

The processes described herein for estimating a quality of lane features of a roadway may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
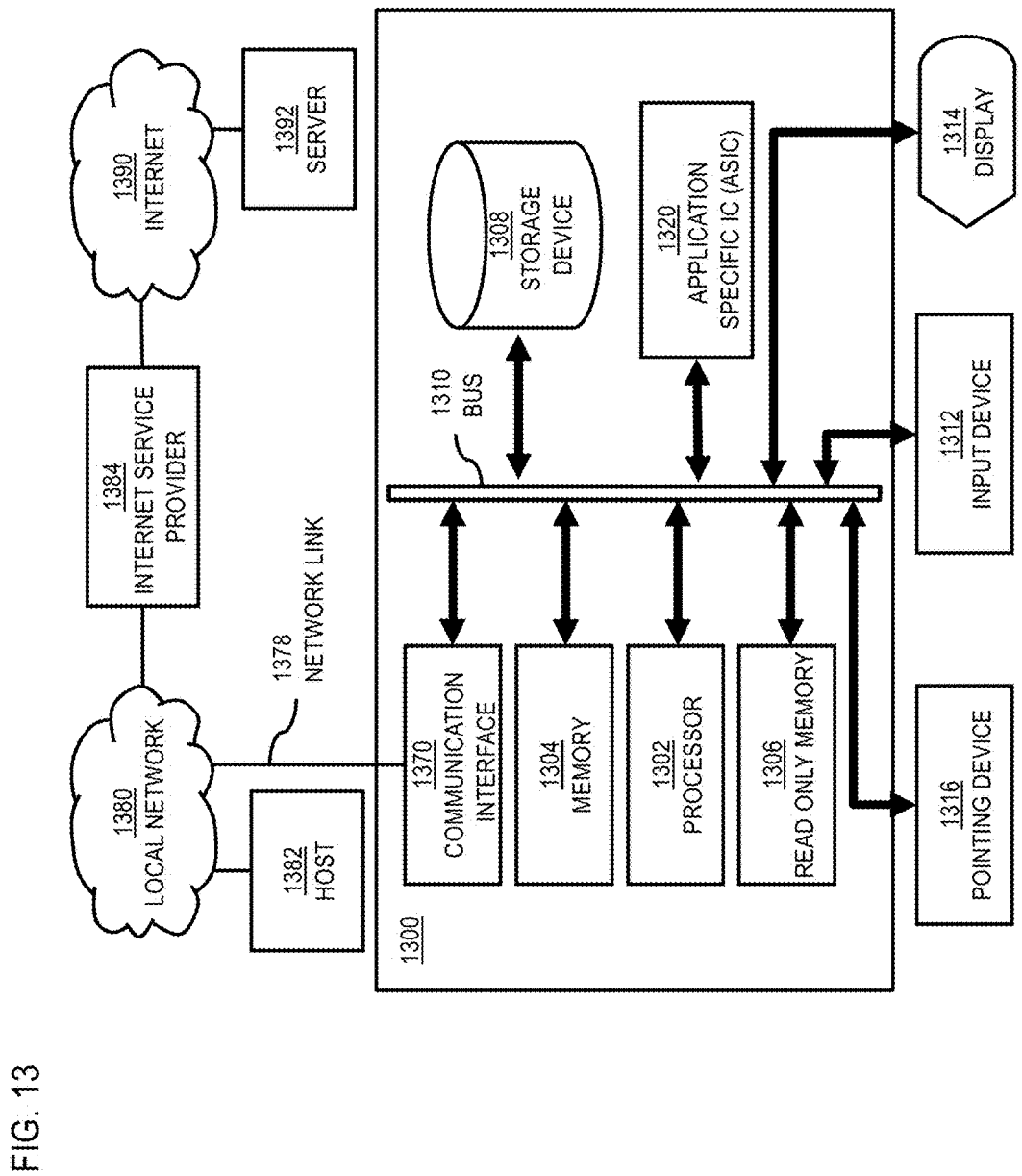
FIG. 13 is a diagram of hardware that can be used to implement an embodiment of the invention.

FIG. 13 illustrates a computer system 1300 upon which an embodiment of the invention may be implemented. Computer system 1300 is programmed (e.g., via computer program code or instructions) to estimate a quality of lane features of a roadway as described herein and includes a communication mechanism such as a bus 1310 for passing information between other internal and external components of the computer system 1300. Information (also called data)

is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to estimating a quality of lane features of a roadway. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for estimating a quality of lane features of a roadway. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for estimating a quality of lane features of a roadway, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 113 for estimating a quality of lane features of a roadway.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment of the invention may be implemented. Chip set 1400 is programmed to estimate a quality of lane features of a roadway as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to estimate a quality of lane features of a roadway. The memory 1405 also stores the data associated with or generated by the execution of the inventive steps.

Figure 15:
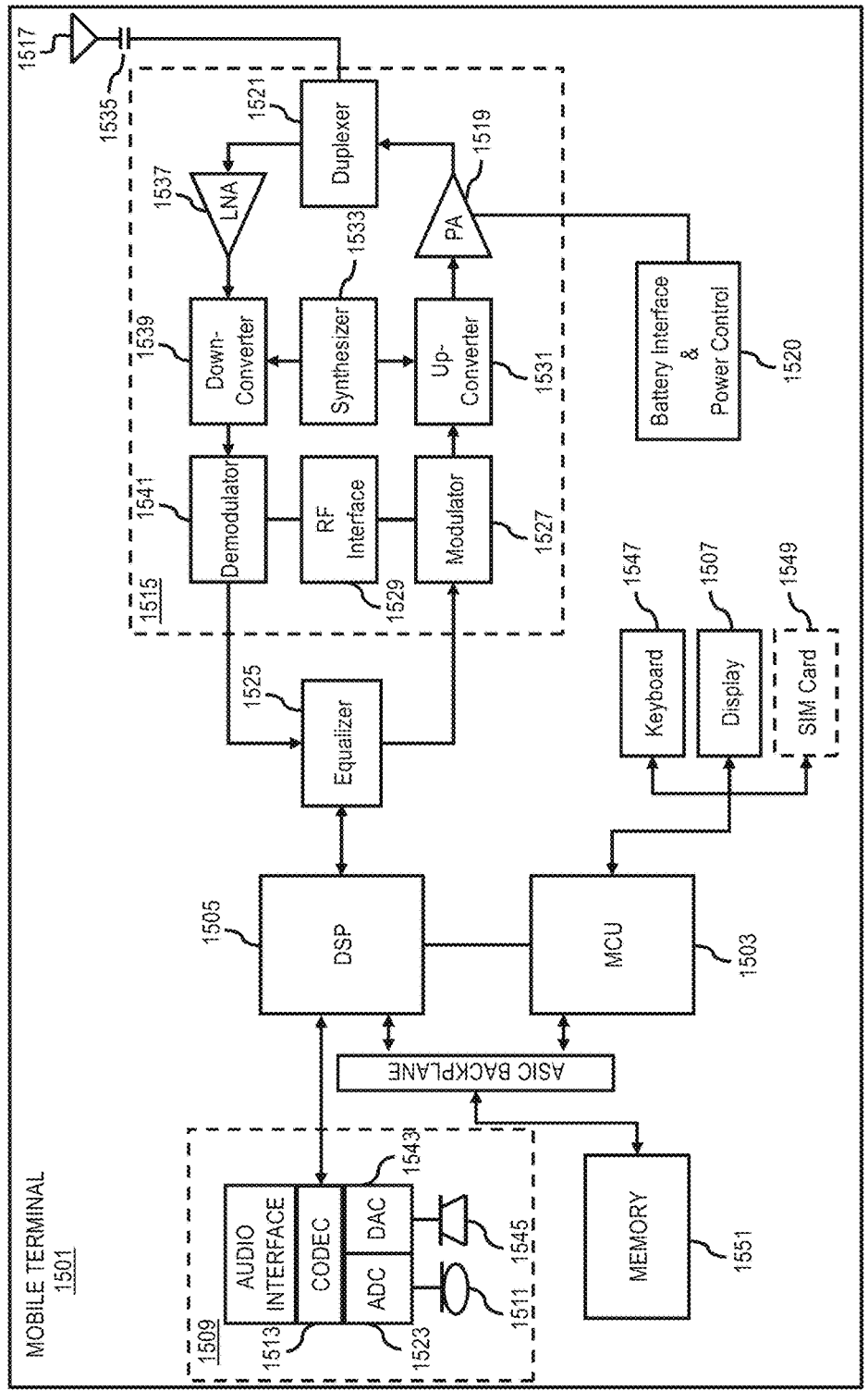
FIG. 15 is a diagram of a mobile terminal (e.g., handset) that can be used to implement an embodiment of the invention.

FIG. 15 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to estimate a quality of lane features of a roadway. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for determining an estimated quality of lane features of a roadway comprising:
   processing, by a computer vision system, an input image to detect the lane features of the roadway;
   determining respective confidence values associated with a plurality of regions of the input image used to detect the lane features, wherein the respective confidence values represent a probability of predicting the lane features from each of the plurality of regions;
   performing a classification of the plurality of regions into a plurality of confidence levels based on the respective confidence values;
   determining the estimated quality of the lane features based on the classification of the plurality of regions;
   specifying a confidence threshold value,
   wherein the plurality of confidence levels includes a high confidence level for the plurality of regions associated with the respective confidence values equal to or greater than the confidence threshold value, and a low confidence level for the plurality of regions associated with the respective confidence values less than the confidence threshold value; and
   computing a percentage of the plurality of regions that are classified into the high confidence level versus the low confidence value,
   wherein the estimated quality of the lane features is based on the percentage.

2. The method of claim 1, wherein the plurality of regions includes a plurality of pixels, a plurality of cells, or a combination thereof.

3. The method of claim 1, further comprising:
   determining a variation of the estimated quality of the lane features over a distance domain, a temporal domain, or a combination thereof.

4. The method of claim 1, further comprising:
   storing the estimated quality of the lane features in association with a data record of the roadway in a geographic database.

5. The method of claim 1, further comprising:
   determining whether to update a data record of the roadway with the lane features based on the estimated quality of the lane features.

6. The method of claim 1, further comprising:
   configuring a driving operation of an autonomous vehicle based on the estimated quality when the autonomous vehicle approaches or travels on the roadway.

7. The method of claim 1, further comprising:
   storing a history of the estimated quality of the lane features for the roadway; and
   detecting a deterioration of paint used to mark the lane features, a condition that obscures the lane features, or a combination thereof based on the history of the estimated quality.

8. The method of claim 1, further comprising:
determining a routing of a vehicle through the roadway based on the estimated quality.

9. An apparatus for determining an estimated quality of lane features of a roadway comprising:
at least one processor; and
at least one memory including computer program code for one or more programs,
the at least one memory and the computer program code configured to, with the at least one processor, cause the apparatus to perform at least the following,
process, by a computer vision system, an input image to detect the lane features of the roadway;
determine respective confidence values associated with a plurality of regions of the input image used to detect the lane features, wherein the respective confidence values represent a probability of predicting the lane features from each of the plurality of regions;
perform a classification of the plurality of regions into a plurality of confidence levels based on the respective confidence values;
determine the estimated quality of the lane features based on the classification of the plurality of regions;
specify a confidence threshold value, wherein the plurality of confidence levels includes a high confidence level for the plurality of regions associated with the respective confidence values equal to or greater than the confidence threshold value, and a low confidence level for the plurality of regions associated with the respective confidence values less than the confidence threshold value; and
compute a percentage of the plurality of regions that are classified into the high confidence level versus the low confidence value,
wherein the estimated quality of the lane features is based on the percentage.

10. The apparatus of claim 9, wherein the apparatus is further caused to:
determine a variation of the estimated quality of the lane features over a distance domain, a temporal domain, or a combination thereof.

11. The apparatus of claim 9, wherein the apparatus is further caused to:
store the estimated quality of the lane features in association with a data record of the roadway in a geographic database.

12. The apparatus of claim 9, wherein the apparatus is further caused to perform at least one of the following:
determine whether to update a data record of the roadway with the lane features based on the estimated quality of the lane features;
configure a driving operation of an autonomous vehicle based on the estimated quality when the autonomous vehicle approaches or travels on the roadway;
determine a routing of a vehicle through the roadway based on the estimated quality; and
detect a deterioration of paint used to mark the lane features, a condition that obscures the lane features, or a combination thereof based on a history of the estimated quality of the lane features for the roadway.

13. A non-transitory computer-readable storage medium for determining an estimated quality of lane features of a roadway, carrying one or more sequences of one or more instructions which, when executed by one or more processors, cause an apparatus to perform:
processing, by a computer vision system, an input image to detect the lane features of the roadway;
determining respective confidence values associated with a plurality of regions of the input image used to detect the lane features, wherein the respective confidence values represent a probability of predicting the lane features from each of the plurality of regions;
performing a classification of the plurality of regions into a plurality of confidence levels based on the respective confidence values;
determining the estimated quality of the lane features based on the classification of the plurality of regions;
specifying a confidence threshold value, wherein the plurality of confidence levels includes a high confidence level for the plurality of regions associated with the respective confidence values equal to or greater than the confidence threshold value, and a low confidence level for the plurality of regions associated with the respective confidence values less than the confidence threshold value; and
computing a percentage of the plurality of regions that are classified into the high confidence level versus the low confidence value,
wherein the estimated quality of the lane features is based on the percentage.

14. The non-transitory computer-readable storage medium of claim 13, wherein the apparatus is further caused to perform:
determining a variation of the estimated quality of the lane features over a distance domain, a temporal domain, or a combination thereof.

15. The non-transitory computer-readable storage medium of claim 13, wherein the apparatus is further caused to perform:
storing the estimated quality of the lane features in association with a data record of the roadway in a geographic database.

16. The non-transitory computer-readable storage medium of claim 13, wherein the apparatus is further caused to perform at least one of the following:
determining whether to update a data record of the roadway with the lane features based on the estimated quality of the lane features;
configuring a driving operation of an autonomous vehicle based on the estimated quality when the autonomous vehicle approaches or travels on the roadway;
determining a routing of a vehicle through the roadway based on the estimated quality; and
detecting a deterioration of paint used to mark the lane features, a condition that obscures the lane features, or a combination thereof based on a history of the estimated quality of the lane features for the roadway.

* * * * *